US012670074B2

(12) United States Patent
Jeng et al.

(10) Patent No.: US 12,670,074 B2
(45) Date of Patent: Jun. 30, 2026

(54) HISTORICAL GENERATION TIME OF DATA ITEMS

(71) Applicant: Walmart Apollo, LLC, Bentonville, AR (US)

(72) Inventors: Menkae Jeng, San Jose, CA (US); Sharat Narayan Hegde, San Jose, CA (US); Kushagra Dar, Sunnyvale, CA (US); Ruchir Choudhry, San Ramon, CA (US)

(73) Assignee: Walmart Apollo, LLC, Bentonville, AR (US)

( * ) Notice: Subject to any disclaimer, the term of this patent is extended or adjusted under 35 U.S.C. 154(b) by 32 days.

(21) Appl. No.: 18/912,990

(22) Filed: Oct. 11, 2024

(65) Prior Publication Data

US 2026/0104968 A1 Apr. 16, 2026

(51) Int. Cl.
*G06F 11/1446* (2026.01)
*G06F 16/23* (2019.01)

(52) U.S. Cl.
CPC ...... *G06F 11/1469* (2013.01); *G06F 16/2379* (2019.01); *G06F 2201/80* (2013.01)

(58) Field of Classification Search
None
See application file for complete search history.

(56) References Cited

U.S. PATENT DOCUMENTS 9,043,274 B1 * 5/2015 Cheng ................... H04L 43/106
707/613
2006/0155945 A1 7/2006 McGarvey
2007/0282790 A1 12/2007 Goulko et al.
2012/0173932 A1 7/2012 Li et al.
(Continued)

FOREIGN PATENT DOCUMENTS

CN 105159818 A 12/2015
CN 109344226 A 2/2019
EP 3217301 A1 9/2017

OTHER PUBLICATIONS

V. Shekhawat, "Handling High Throughout Real-Time Pipelines Writes to Databases: Challenges and Strategies," Medium.com, Nov. 6, 2023, 18 pages.
(Continued)

*Primary Examiner* — Richard L Bowen
(74) *Attorney, Agent, or Firm* — Morgan, Lewis & Bockius LLP; Manita Rawat

(57) ABSTRACT
Examples relate to data update requests for data items stored at a data store in a data system. In some examples, real-time data update requests to update data items at the data store via a plurality of data update nodes are received, where each data update node has a respective local map. In response to the real-time data update requests and for each respective data item, a respective data item is assigned to a respective data update node. The respective data item in the data store is updated and respective supplemental data of the respective data item including a historical time stamp indicating a historical generation time of the respective data item is stored in the respective local map of the respective data update node. A copy of the respective supplemental data of the respective data item is stored in a central database.

19 Claims, 14 Drawing Sheets

1100

(56) References Cited

U.S. PATENT DOCUMENTS

| | | | | |
|---|---|---|---|---|
| 2013/0061253 | A1* | 3/2013 | Bernbo | G06F 3/0643 |
| | | | | 719/328 |
| 2013/0066960 | A1* | 3/2013 | Fieremans | H04L 65/80 |
| | | | | 709/203 |
| 2014/0115251 | A1 | 4/2014 | Bwelluomini et al. | |
| 2014/0289188 | A1 | 9/2014 | Shimanovsky et al. | |
| 2016/0292037 | A1 | 10/2016 | Kandukuri et al. | |
| 2018/0210792 | A1* | 7/2018 | Pillai | G06F 11/1451 |
| 2018/0365286 | A1 | 12/2018 | Phagan | |
| 2020/0068010 | A1* | 2/2020 | Xing | G06F 16/2228 |
| 2021/0042292 | A1* | 2/2021 | Gentric | G06F 16/2365 |
| 2022/0358123 | A1 | 11/2022 | Kancharla et al. | |
| 2022/0382650 | A1* | 12/2022 | Schreter | G06F 11/1469 |

OTHER PUBLICATIONS

Y. Huang, "How We Solve Load Balancing Challenges in Apache Kafka," Medium.com, Agoda Engineering & Design, May 6, 2024, 22 pages.

\* cited by examiner

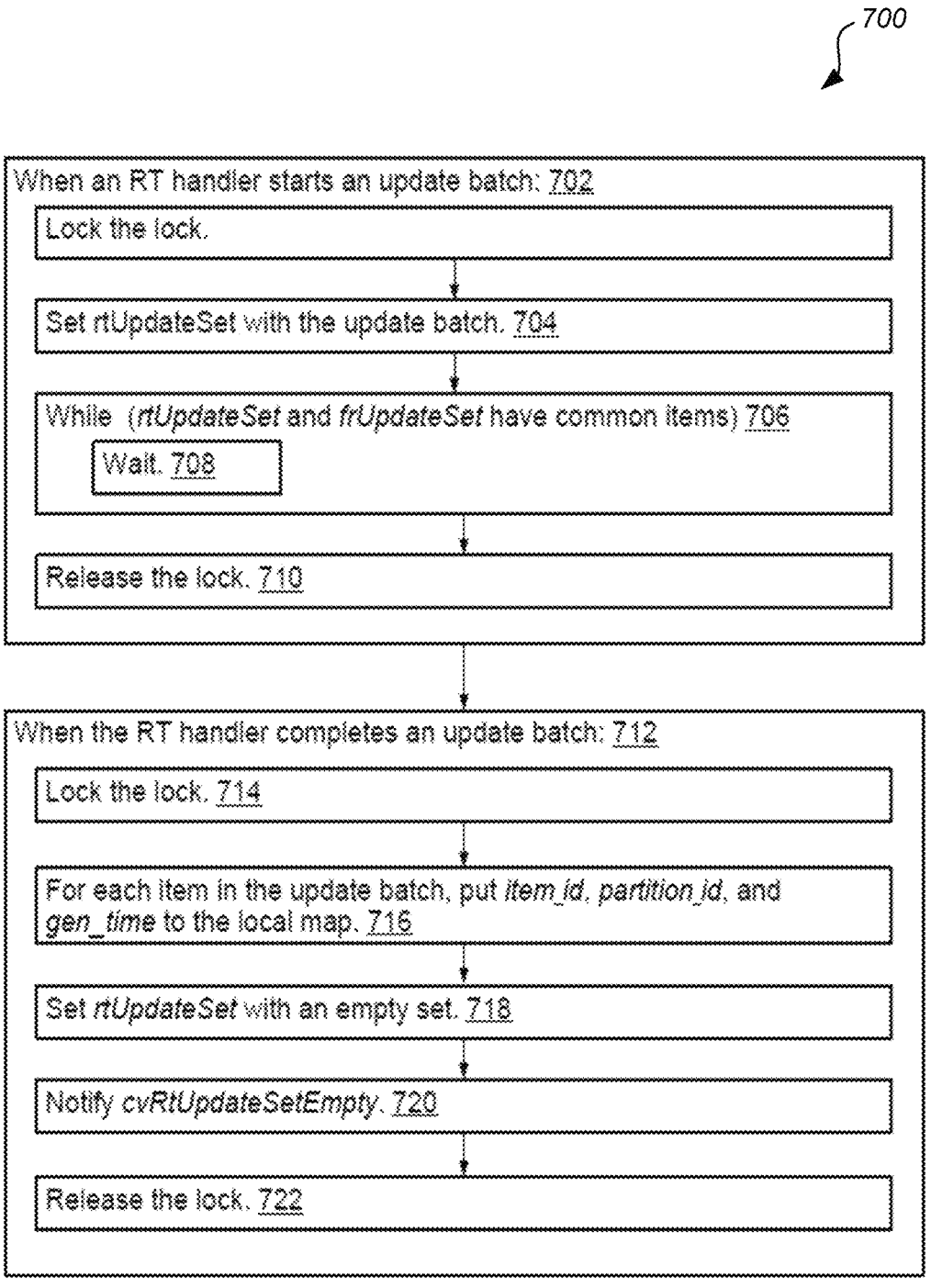

700

When an RT handler starts an update batch: 702

Lock the lock.

Set rtUpdateSet with the update batch. 704

While (rtUpdateSet and frUpdateSet have common items) 706

Wait. 708

Release the lock. 710

When the RT handler completes an update batch: 712

Lock the lock. 714

For each item in the update batch, put item_id, partition_id, and gen_time to the local map. 716

Set rtUpdateSet with an empty set. 718

Notify cvRtUpdateSetEmpty. 720

Release the lock. 722

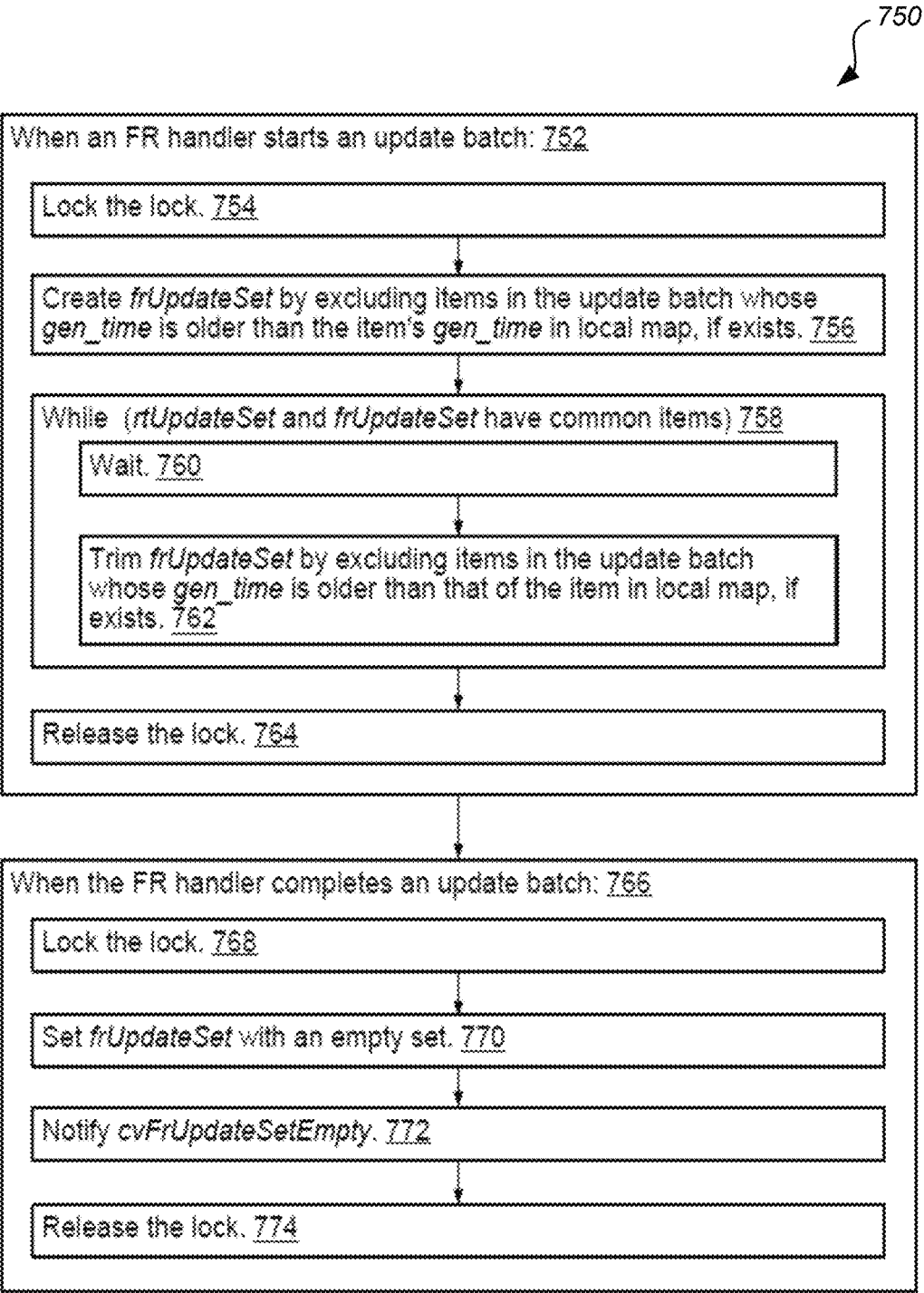

When an FR handler starts an update batch: 752

Lock the lock. 754

Create *frUpdateSet* by excluding items in the update batch whose *gen_time* is older than the item's *gen_time* in local map, if exists. 756

While (*rtUpdateSet* and *frUpdateSet* have common items) 758

Wait. 760

Trim *frUpdateSet* by excluding items in the update batch whose *gen_time* is older than that of the item in local map, if exists. 762

Release the lock. 764

When the FR handler completes an update batch: 766

Lock the lock. 768

Set *frUpdateSet* with an empty set. 770

Notify *cvFrUpdateSetEmpty*. 772

Release the lock. 774

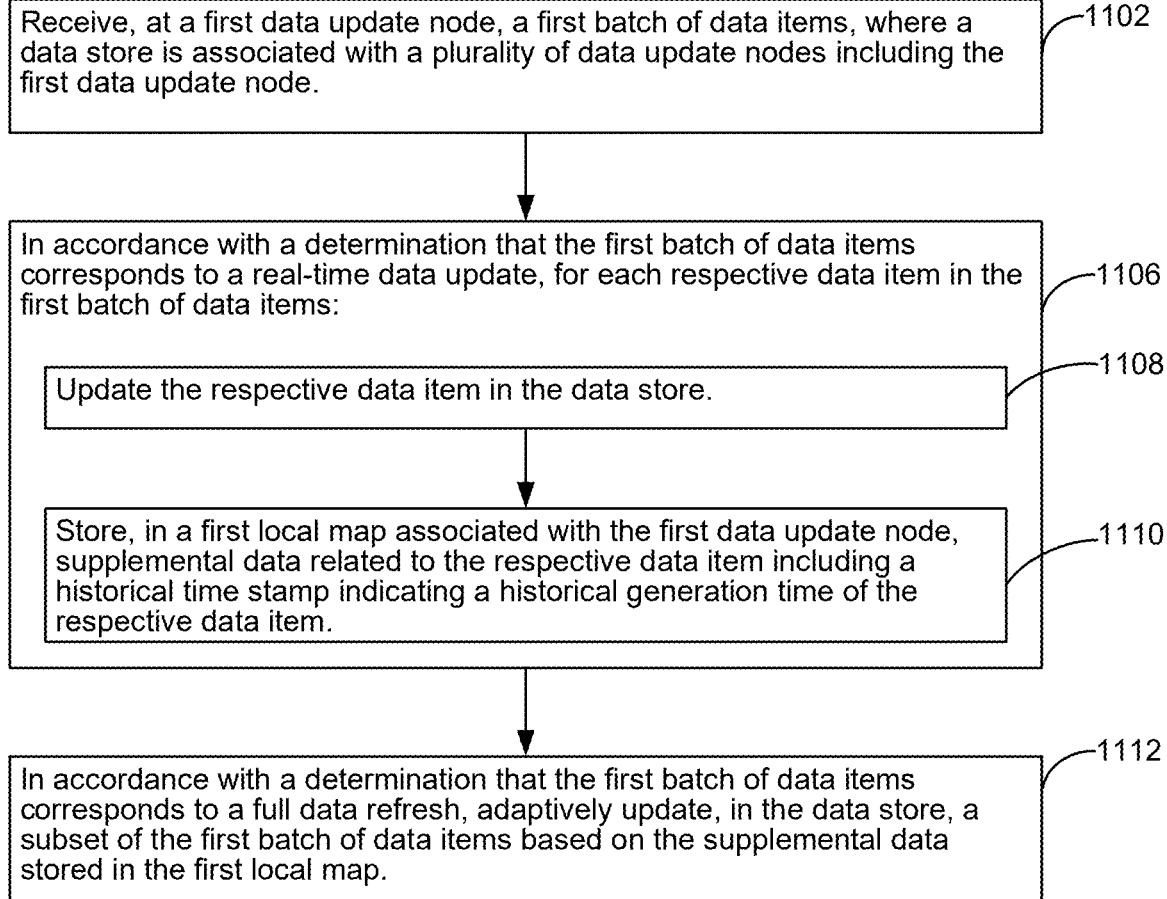

Receive, at a first data update node, a first batch of data items, where a data store is associated with a plurality of data update nodes including the first data update node. ⌐1102

In accordance with a determination that the first batch of data items corresponds to a real-time data update, for each respective data item in the first batch of data items: ⌐1106

Update the respective data item in the data store. ⌐1108

Store, in a first local map associated with the first data update node, supplemental data related to the respective data item including a historical time stamp indicating a historical generation time of the respective data item. ⌐1110

In accordance with a determination that the first batch of data items corresponds to a full data refresh, adaptively update, in the data store, a subset of the first batch of data items based on the supplemental data stored in the first local map. ⌐1112

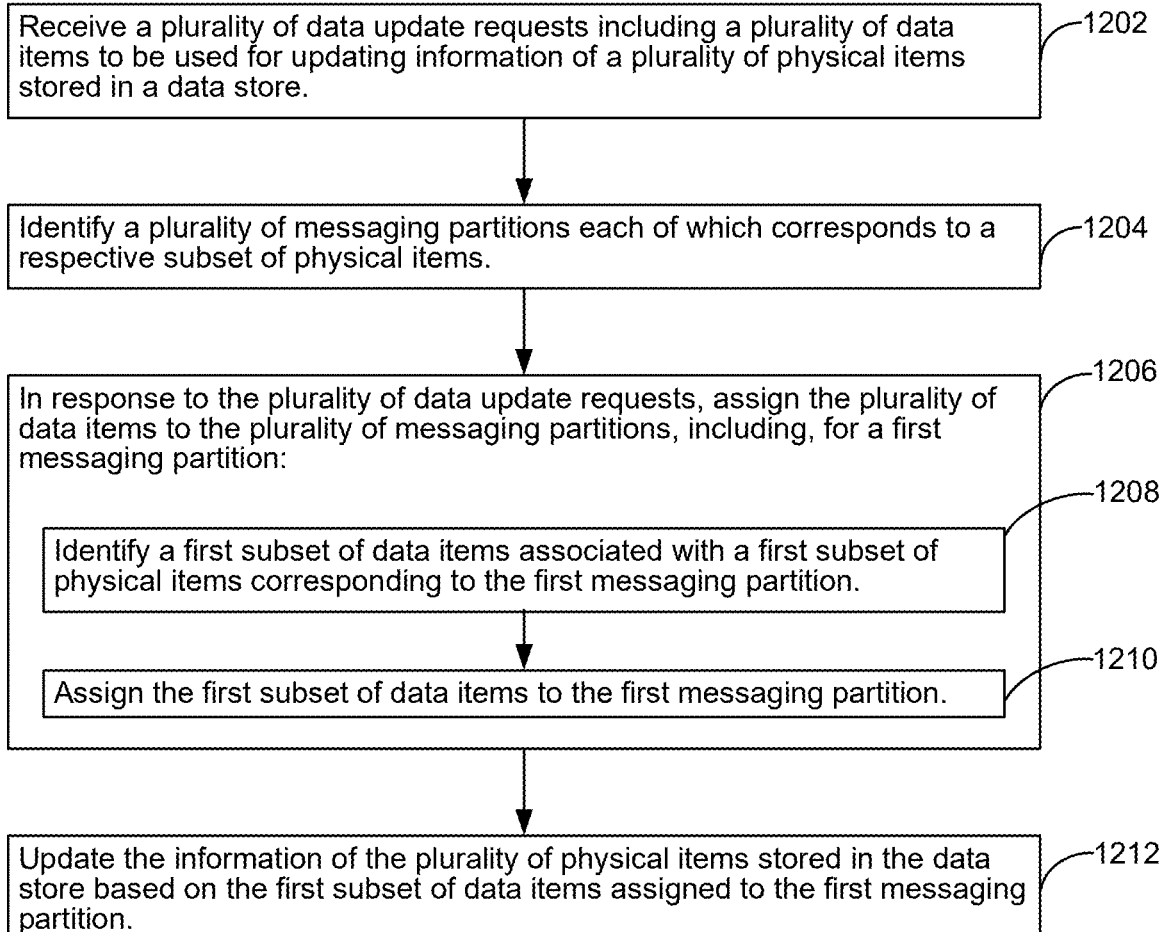

Receive a plurality of data update requests including a plurality of data items to be used for updating information of a plurality of physical items stored in a data store. — 1202

Identify a plurality of messaging partitions each of which corresponds to a respective subset of physical items. — 1204

In response to the plurality of data update requests, assign the plurality of data items to the plurality of messaging partitions, including, for a first messaging partition: — 1206

Identify a first subset of data items associated with a first subset of physical items corresponding to the first messaging partition. — 1208

Assign the first subset of data items to the first messaging partition. — 1210

Update the information of the plurality of physical items stored in the data store based on the first subset of data items assigned to the first messaging partition. — 1212

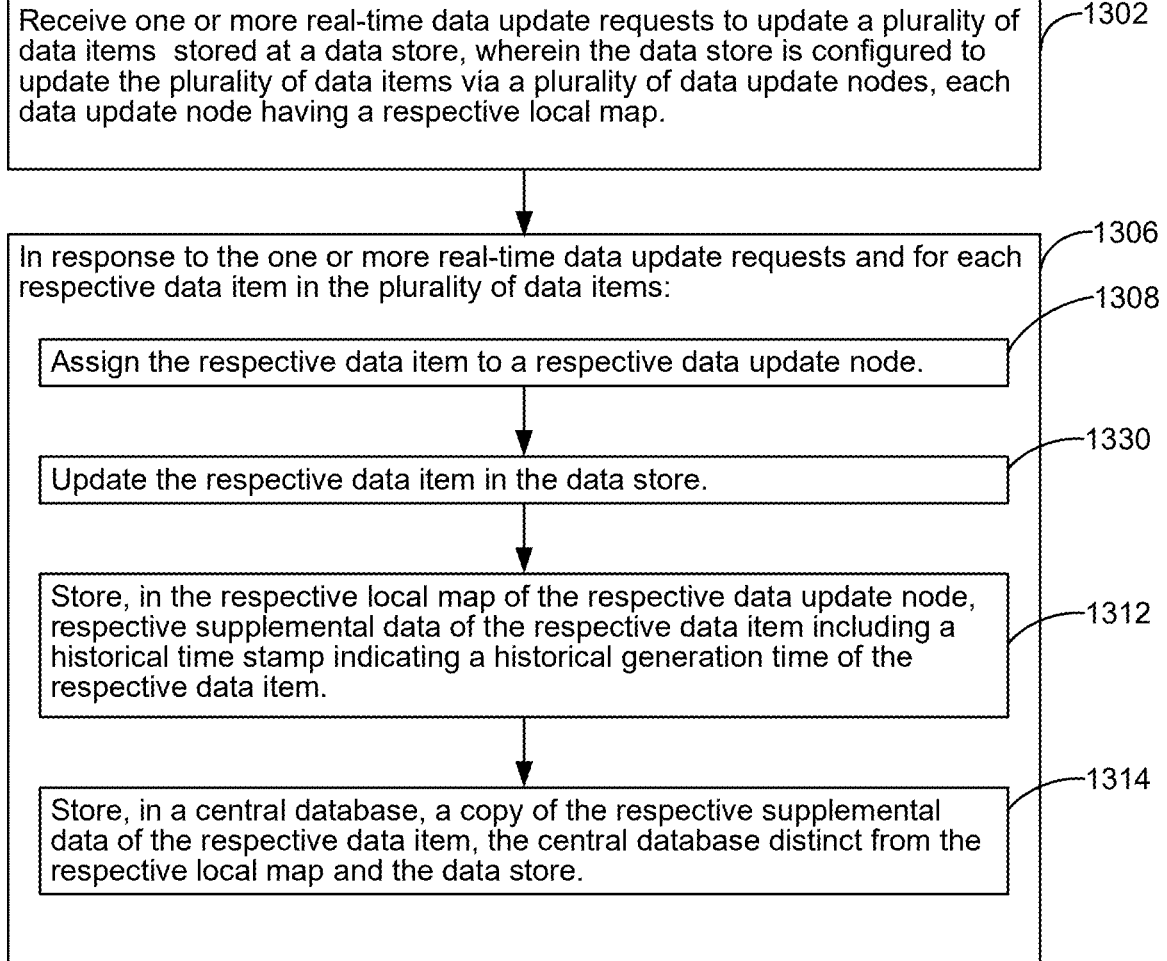

Receive one or more real-time data update requests to update a plurality of data items  stored at a data store, wherein the data store is configured to update the plurality of data items via a plurality of data update nodes, each data update node having a respective local map. ⟋1302

In response to the one or more real-time data update requests and for each respective data item in the plurality of data items: ⟋1306 ⟋1308

Assign the respective data item to a respective data update node.

Update the respective data item in the data store. ⟋1330

Store, in the respective local map of the respective data update node, respective supplemental data of the respective data item including a historical time stamp indicating a historical generation time of the respective data item. ⟋1312

Store, in a central database, a copy of the respective supplemental data of the respective data item, the central database distinct from the respective local map and the data store. ⟋1314

FIG. 13

HISTORICAL GENERATION TIME OF DATA ITEMS

TECHNICAL FIELD

This application relates generally to information processing and, more particularly, to systems and methods for controlling data loss and recovering lost data for data systems that update data via multiple data pipelines.

BACKGROUND

Organizations may provide data systems for users to browse and search data. Data systems that support applications with time-sensitive data, such as flash sales and inventory changes, may utilize a process to handle real-time data changes to maintain up-to-date information. Data in systems also may need to be fully refreshed for reasons such as adding new data fields or updating data fields that do not have real-time change events, among others. However, data loss issues can arise between full refresh and real-time refresh processes in data systems. Full refreshes involve replacing large data sets at scheduled intervals, which can inadvertently overwrite recent real-time data changes if not carefully managed, leading to loss of critical updates.

SUMMARY

In various embodiments, a system including a data store, a non-transitory memory configured to store instructions thereon, and at least one processor is disclosed. The data store is associated with a plurality of data update nodes including a first data update node. The at least one processor is configured to receive, at the first data update node, a first batch of data items. The at least one processor is further configured to, in accordance with a determination that the first batch of data items corresponds to a real-time data update, for each respective data item in the first batch of data items, update the respective data item in the data store and store, in a first local map associated with the first data update node, supplemental data related to the respective data item including a historical time stamp indicating a historical generation time of the respective data item. The at least one processor is further configured to, in accordance with a determination that the first batch of data items corresponds to a full data refresh, adaptively update, in the data store, a subset of the first batch of data items based on the supplemental data stored in the first local map.

In various embodiments, a computer-implemented method is disclosed. The computer-implemented method is performed at a system having a data store associated with a plurality of data update nodes that further includes a first data update node. The computer-implemented method includes steps of receiving, at the first data update node, a first batch of data items; in accordance with a determination that the first batch of data items corresponds to a real-time data update, for each respective data item in the first batch of data items, updating the respective data item in the data store and storing, in a first local map associated with the first data update node, supplemental data related to the respective data item including a historical time stamp indicating a historical generation time of the respective data item; and in accordance with a determination that the first batch of data items corresponds to a full data refresh, adaptively updating, in the data store, a subset of the first batch of data items based on the supplemental data stored in the first local map.

In various embodiments, a non-transitory computer readable medium having instructions stored thereon is disclosed. The instructions, when executed by at least one processor, cause at least one device to perform operations including receiving, at a first data update node, a first batch of data items; in accordance with a determination that the first batch of data items corresponds to a real-time data update, for each respective data item in the first batch of data items, updating the respective data item in a data store and storing, in a first local map associated with the first data update node, supplemental data related to the respective data item including a historical time stamp indicating a historical generation time of the respective data item; and in accordance with a determination that the first batch of data items corresponds to a full data refresh, adaptively updating, in the data store, a subset of the first batch of data items based on the supplemental data stored in the first local map.

In various embodiments, a system including a non-transitory memory configured to store instructions thereon and at least one processor is disclosed. The at least one processor is configured to receive one or more real-time data update requests to update a plurality of data items stored at a data store. The data store is configured to update the plurality of data items via a plurality of data update nodes, and each update node has a respective local map. The at least one processor is further configured to, in response to the one or more real-time data update requests and for each respective data item in the plurality of data items, assign the respective data item to a respective data update node, update the respective data item in the data store, and store, in the respective local map of the respective data update node, respective supplemental data of the respective data item including a historical time stamp indicating a historical generation time of the respective data item. The at least one processor is further configured to store, in a central database, a copy of the respective supplemental data of the respective data item. The central database is distinct from the respective local map and the data store.

In various embodiments, a computer-implemented method is disclosed. The computer-implemented method includes steps of receiving one or more real-time data update requests to update a plurality of data items stored at a data store, where the data store is configured to update the plurality of data items via a plurality of data update nodes, and each data update node has a respective local map; and in response to the one or more real-time data update requests and for each respective data item in the plurality of data items, assigning the respective data item to a respective data update node, updating the respective data item in the data store, storing, in the respective local map of the respective data update node, respective supplemental data of the respective data item including a historical time stamp indicating a historical generation time of the respective data item, and storing, in a central database, a copy of the respective supplemental data of the respective data item, where the central database is distinct from the respective local map and the data store.

In various embodiments, a non-transitory computer readable medium having instructions stored thereon is disclosed. The instructions, when executed by at least one processor, cause at least one device to perform operations including receiving one or more real-time data update requests to update a plurality of data items stored at a data store, where the data store is configured to update the plurality of data items via a plurality of data update nodes, and each data update node has a respective local map; and in response to the one or more real-time data update requests and for each respective data item in the plurality of data items, assigning the respective data item to a respective data update node, updating the respective data item in the data store, storing, in the respective local map of the respective data update node, respective supplemental data of the respective data item including a historical time stamp indicating a historical generation time of the respective data item, and storing, in a central database, a copy of the respective supplemental data of the respective data item. The central database is distinct from the respective local map and the data store.

BRIEF DESCRIPTION OF THE DRAWINGS

Various examples will be described in the following detailed description, which is to be considered together with the accompanying drawings wherein like numbers refer to like parts and further wherein:

FIG. 7A is a flow diagram of an example process of updating a batch of data items by a real-time handler, in accordance with some embodiments, FIG. 7B is a flow diagram of an example process of updating a batch of data items by a full refresh handler, in accordance with some embodiments.

FIG. 11 is a flowchart illustrating an example method for managing data updates of a data store, in accordance with some embodiments;

FIG. 12 is a flowchart illustrating an example method for managing data updates of a data store, in accordance with some embodiments; and FIG. 13 is a flowchart illustrating an example method for managing data updates of a data store, in accordance with some embodiments.

DETAILED DESCRIPTION

Figure 1:
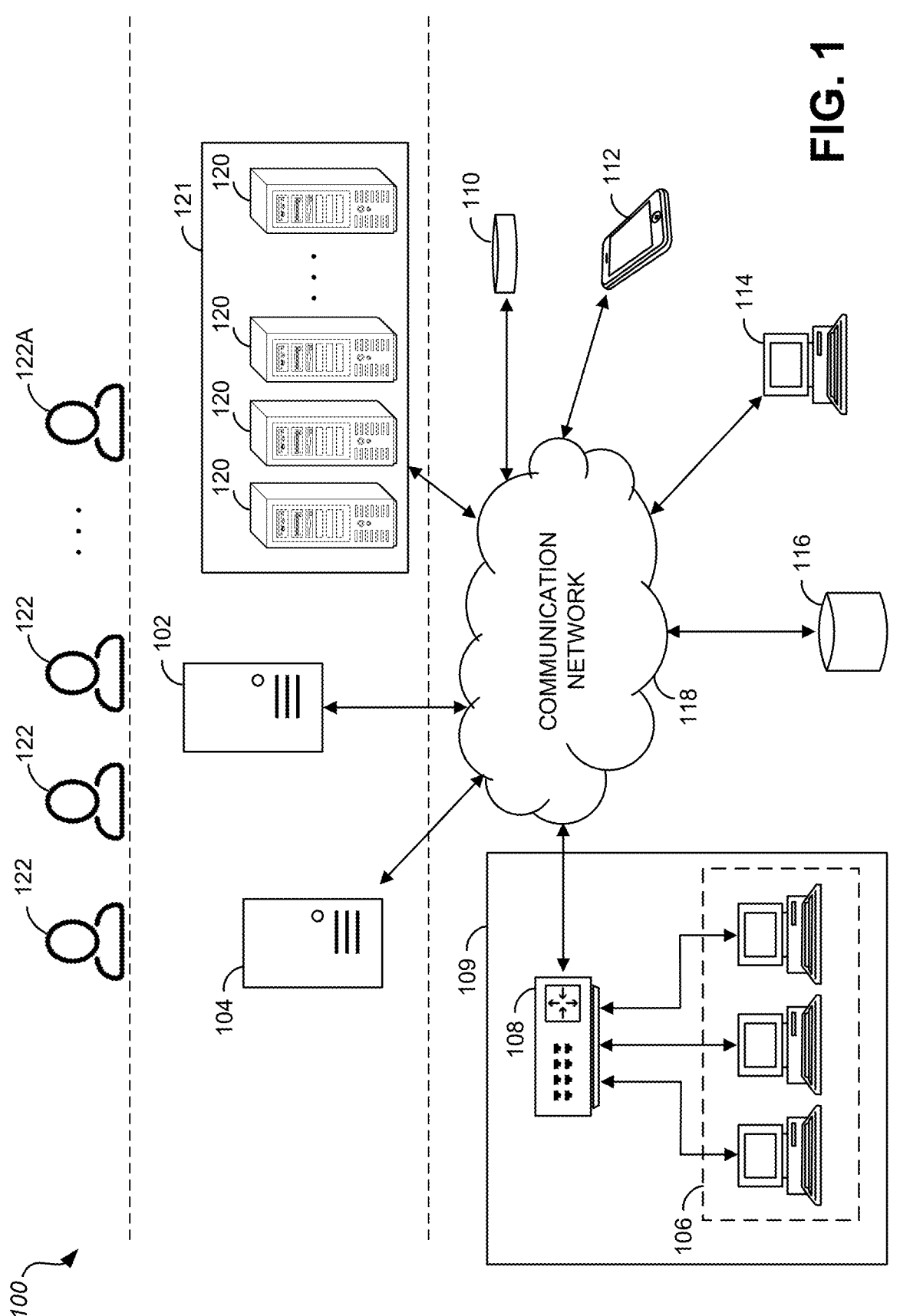
FIG. 1 depicts a network environment that can provide a user application to a plurality of users, in accordance with some embodiments.

This description of the example embodiments is intended to be read in connection with the accompanying drawings, which are to be considered part of the entire written description. Terms concerning data connections, coupling and the like, such as "connected" and "interconnected," and/or "in signal communication with" refer to a relationship wherein systems or elements are electrically and/or wirelessly connected to one another either directly or indirectly through intervening systems, as well as both moveable or rigid attachments or relationships, unless expressly described otherwise. The term "operatively coupled" is such a coupling or connection that allows the pertinent structures to operate as intended by virtue of that relationship. In the following, various embodiments are described with respect to the claimed systems as well as with respect to the claimed methods. Features, advantages or alternative embodiments herein can be assigned to the other claimed objects and vice versa. In other words, claims for the systems can be improved with features described or claimed in the context of the methods. In this case, the functional features of the method are embodied by objective units of the systems.

Various embodiments described herein are directed to systems and methods for preventing data loss and/or recovering lost data independently of a type of a data store applied to store data. In some embodiments, real-time data updates and full data refreshes are implemented on the data store via two separate pipelines associated with a cluster of data update nodes of the data store. The data store includes a plurality of data update nodes. Each data update node corresponds to a respective partition of data messages, and may receive updates of the respective partition of data messages via either one of the two separate pipelines for a real-time data update and a full data refresh. Each data update node also includes an in-memory local map. A real-time data pipeline tracks a historical generation time of respective data items associated with a respective data update node, and the historical generation time is stored and/or updated in the in-memory local map of the respective data update node. The full refresh data pipeline can look up historical generation times stored in the in-memory local map of the respective data update node and skip updates of the respective data items associated with the respective data update node based on the historical generation times. Additionally, in some embodiments, information associated with data items stored and/or updated in in-memory local maps of a plurality of data update nodes may be backed up in a central database, and a fault tolerant method may be implemented to recover, from the central database, data items stored in an in-memory local map of a certain data update node when the data update node fails or restarts.

The disclosed systems and methods enable data stored in the data store to be updated with the latest data items in a reliable manner, e.g., by tracking, and saving additional copies of, historical generation times of the data items involved in the real-time data update. Real-time data changes may be protected from being overwritten by full data refreshes. Stated another way, in some implementations, backup strategies, real-time monitoring, and robust error-handling mechanisms may be applied in this application to ensure the integrity and availability of data during real-time and full refresh processes.

FIG. 1 depicts a network environment 100 that can provide a user application (e.g., a network interface application, an online shopping application, etc.) to a plurality of users, in accordance with some embodiments. The network environment 100 includes a plurality of devices or systems that communicate over one or more network channels, illustrated as a network cloud 118. For example, in various embodiments, the network environment 100 can include, but is not limited to, a computing device 102 (e.g., a server, such as an application server), a web server 104, a cloud-based engine 121 including one or more processing devices 120, workstation(s) 106, a database 116, and one or more user computing devices 110, 112, 114 operatively coupled over the network 118. The computing device 102, the web server 104, the workstation(s) 106, the processing device(s) 120, and the multiple user computing devices 110, 112, 114 can each be any suitable computing device that includes any hardware or hardware and software combination for processing and handling information. For example, each can include one or more processors, one or more field-programmable gate arrays (FPGAs), one or more application-specific integrated circuits (ASICs), one or more state machines, digital circuitry, or any other suitable circuitry. In addition, each can transmit and receive data over the communication network 118.

In some examples, each of the computing device 102 and the processing device(s) 120 can be a computer, a workstation, a laptop, a server such as a cloud-based server, or any other suitable device. In some examples, each of the processing devices 120 is a server that includes one or more processing units, such as one or more graphical processing units (GPUs), one or more central processing units (CPUs), and/or one or more processing cores. Each processing device 120 may, in some examples, execute one or more virtual machines. In some examples, processing resources (e.g., capabilities) of the one or more processing devices 120 are offered as a cloud-based service (e.g., cloud computing). For example, the cloud-based engine 121 may offer computing and storage resources of the one or more processing devices 120 to the computing device 102.

In some examples, each of the user computing devices 110, 112, 114 can be a cellular phone, a smart phone, a tablet, a personal assistant device, a voice assistant device, a digital assistant, a laptop, a computer, or any other suitable device. In some examples, the web server 104 hosts one or more network environments, or portions thereof, such as an e-commerce environment. In some examples, the computing device 102, the processing devices 120, and/or the web server 104 are operated by a network environment provider, and the multiple user computing devices 110, 112, 114 are operated by users 122 of the network environment. In some examples, the processing devices 120 are operated by a third party (e.g., a cloud-computing provider).

The workstation(s) 106 are operably coupled to the communication network 118 via a router (or switch) 108. The workstation(s) 106 and/or the router 108 may be located at a physical location 109, for example. The workstation(s) 106 can communicate with the computing device 102 over the communication network 118. The workstation(s) 106 may send data to, and receive data from, the computing device 102.

Although FIG. 1 illustrates three user computing devices 110, 112, 114, the network environment 100 can include any number of user computing devices 110, 112, 114. Similarly, the network environment 100 can include any number of the recommendation computing devices 102, the processing devices 120, the workstations 106, the web servers 104, and the databases 116.

The communication network 118 can be a WiFi® network, a cellular network such as a 3GPP® network, a Bluetooth® network, a satellite network, a wireless local area network (LAN), a network utilizing radio-frequency (RF) communication protocols, a Near Field Communication (NFC) network, a wireless Metropolitan Area Network (MAN) connecting multiple wireless LANs, a wide area network (WAN), or any other suitable network. The communication network 118 can provide access to, for example, the Internet.

Each of the user computing devices 110, 112, 114 may communicate with the web server 104 over the communication network 118. For example, each of the user computing devices 110, 112, 114 may be operable to view, access, and interact with a website, such as an e-commerce website, hosted by the web server 104. The web server 104 may transmit user session data related to a user's activity (e.g., interactions) on the website. For example, a user may operate one of the user computing devices 110, 112, 114 to initiate a web browser that is directed to the website hosted by the web server 104. The user may, via the web browser, login to or otherwise interact with a software application or web application interface, for example. The website may capture these activities as user session data, and transmit the user session data to the computing device 102 over the communication network 118.

The computing device 102 may be further operable to communicate with the database 116 over the communication network 118. For example, the computing device 102 can store data to, and read data from, the database 116. The database 116 can be a remote storage device, such as a cloud-based server, a disk (e.g., a hard disk), a memory device on another application server, a networked computer, or any other suitable remote storage. Although shown remote to the computing device 102, in some examples, the database 116 can be a local storage device, such as a hard drive, a non-volatile memory, or a USB stick. The computing device 102 may store purchase data received from the web server 104 in the database 116. The computing device 102 may also receive from the web server 104 user session data identifying events associated with browsing sessions, and may store the user session data in the database 116.

In some embodiments, the network environment 100 may provide a user application (e.g., a network interface application, an online shopping application, etc.) to a plurality of users 122. An example of the plurality of users 122 is a plurality of users that share resources via the network environment 100. The user application is deployed for the plurality of users 122, and executed to process requests associated with the plurality of users 122 in the network environment 100 after the plurality of users 122 is authenticated and authorized to access the user application. For example, login pages are displayed on the workstation(s) 106 and the multiple customer computing devices 110, 112 and 114, allowing the plurality of users 122 to provide their credentials (e.g., user names, passwords). In some embodiments, upon authentication, requests associated with the plurality of users 122 (e.g., search requests, purchase requests, account review requests, item recommendation requests) are received from the workstation(s) 106 and customer computing devices 110, 112 and 114.

The network environment 100 is implemented to enable secure concurrent access experience by multiple users 122 of the user application. User interactions (e.g., queries, actions, etc.) of the plurality of users 122 are managed in a centralized manner by the computing device 102 and/or the cloud-based engine 121.

Figure 2:
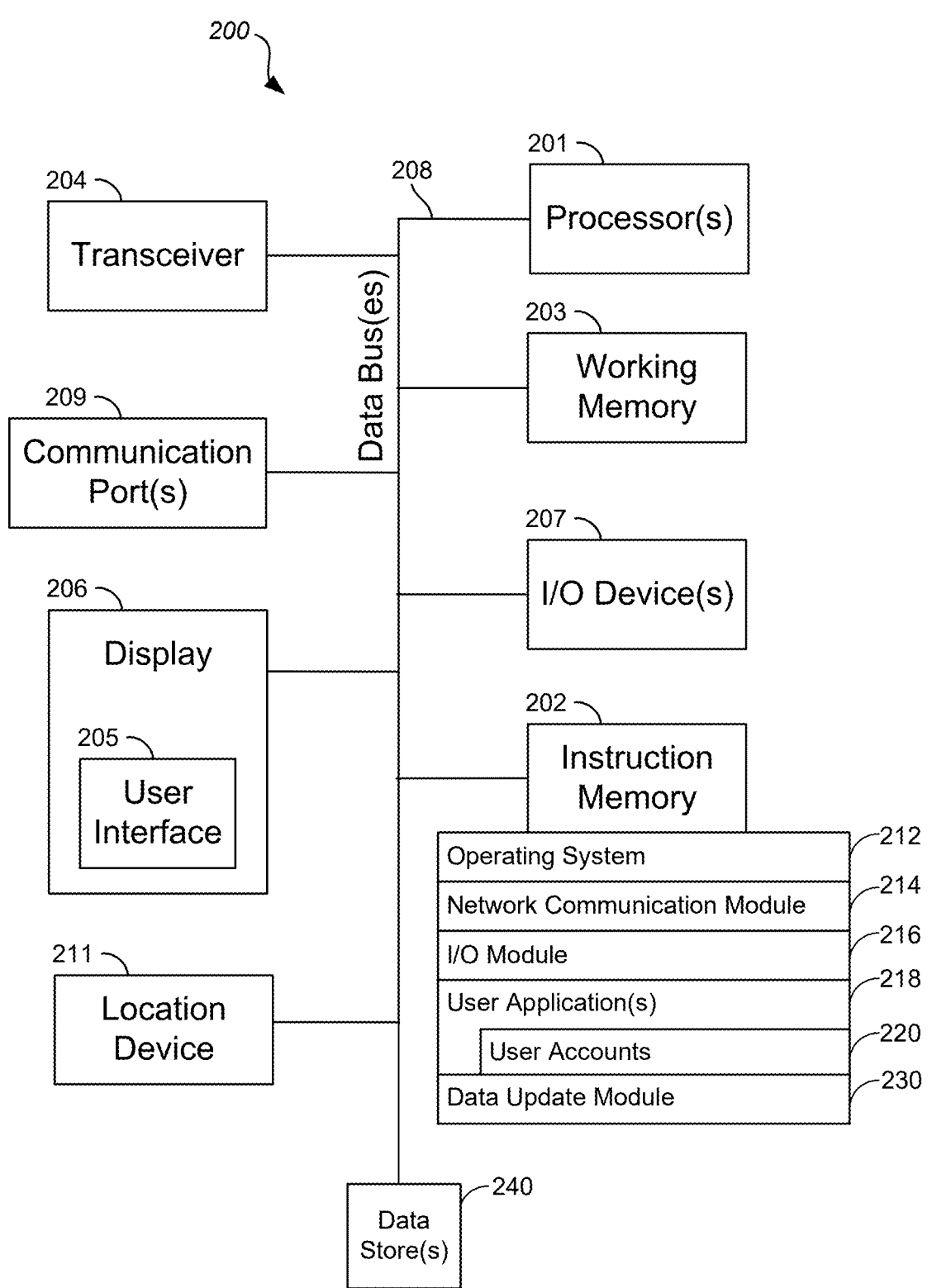
FIG. 2 is a block diagram of a computing device, in accordance with some embodiments.

FIG. 2 is a block diagram of a computing device 200, in accordance with some embodiments of the present teaching. In some embodiments, each of the computing device 102, the web server 104, the workstation(s) 106, the user computing devices 110, 112, 114, and/or the one or more processing devices 120 in FIG. 1 may include the features shown in FIG. 2. Referring to FIG. 2, the computing device 200 includes one or more of: one or more processors 201, a working memory 202, one or more input/output (I/O) devices 207, an instruction memory 203, a transceiver 204, one or more communication ports 209, a display 206 with a user interface 205, and an optional location device 211, all operatively coupled to one or more data buses 208. The data buses 208 allow for communication among the various devices. The data buses 208 can include wired, or wireless, communication channels.

The processors 201 can include one or more distinct processors, each having one or more cores. Each of the distinct processors can have the same or different structure. The processors 201 can include one or more central processing units (CPUs), one or more graphics processing units (GPUs), application specific integrated circuits (ASICs), digital signal processors (DSPs), and the like.

The instruction memory 202 can store instructions that can be accessed (e.g., read) and executed by the processors 201. For example, the instruction memory 202 can be a non-transitory, computer-readable storage medium such as a read-only memory (ROM), an electrically erasable programmable read-only memory (EEPROM), flash memory, a removable disk, CD-ROM, any non-volatile memory, or any other suitable memory. The processors 201 can perform a certain function or operation by executing code, stored on the instruction memory 202, embodying the function or operation. For example, the processors 201 can execute code stored in the instruction memory 202 to perform one or more of any function, method, or operation disclosed herein.

Additionally, the processors 201 can store data to, and read data from, the working memory 202. For example, the processors 201 can store a working set of instructions to the working memory 202, such as instructions loaded from the instruction memory 202. The processors 201 can also use the working memory 202 to store dynamic data created during the operation of the computing device 102. The working memory 202 can be a random access memory (RAM) such as a static random access memory (SRAM) or dynamic random access memory (DRAM), or any other suitable memory.

The input-output devices 207 can include any suitable device that allows for data input or output. For example, the input-output devices 207 can include one or more of a keyboard, a touchpad, a mouse, a stylus, a touchscreen, a physical button, a speaker, a microphone, or any other suitable input or output device.

The communication port(s) 209 can include, for example, a serial port such as a universal asynchronous receiver/transmitter (UART) connection, a Universal Serial Bus (USB) connection, or any other suitable communication port or connection. In some examples, the communication port(s) 209 allows for the programming of executable instructions in the instruction memory 202. In some examples, the communication port(s) 209 allow for the transfer (e.g., uploading or downloading) of data, such as model training data.

The display 206 can be any suitable display, and may display the user interface 205. The user interfaces 205 can enable user interaction with the computing device 102. For example, the user interface 205 can be a user interface for an application of a retailer that allows a customer to view and interact with a retailer's website. In some examples, a user can interact with the user interface 205 by engaging the input-output devices 207. In some examples, the display 206 can be a touchscreen, where the user interface 205 is displayed on the touchscreen.

The transceiver 204 allows for communication with a network, such as the communication network 118 of FIG. 1. For example, if the communication network 118 of FIG. 1 is a cellular network, the transceiver 204 is configured to allow communications with the cellular network. In some examples, the transceiver 204 is selected based on the type of the communication network 118 the computing device 102 will be operating in. The processor(s) 201 is operable to receive data from, or send data to, a network, such as the communication network 118 of FIG. 1, via the transceiver 204.

The optional location device 211 may be communicatively coupled to one or more location services and/or devices and operable to receive position data from the corresponding location services. For example, the location device 211 may receive position data identifying a latitude, and longitude, from a satellite of a positioning constellation. Based on the position data, the computing device 102 may determine a local geographical area (e.g., town, city, state, etc.) of its position.

In some embodiments, the computing device 200 is configured to implement a user application for a plurality of users 122 via service deployment, service execution, self-learning and fine tuning, and session knowledge enrichment. In some embodiments, the working memory 203, or alternatively the non-transitory computer readable storage medium of memory 202, stores the following programs, modules and data structures, instructions, or a subset thereof:

Operating system 212 that includes procedures for handling various basic system services and for performing hardware dependent tasks;

Communication module 214 that is used for connecting the computing device 200 to other machines (e.g., other devices 102, 104, 120, 106, 110, 112, 114, and/or 116 in the network environment 100) via one or more network communication ports 209 (wired or wireless) and one or more communication networks 118, such as the Internet, other wide area networks, local area networks, metropolitan area networks, and so on;

I/O module 216 that includes procedures for handling various basic input and output functions through one or more input and output devices;

One or more user applications 218 that are executed to provide server-side functionalities, where in some embodiments, each user application 218 is an online interface application that may have a plurality of user accounts 220 associated with registered and/or guest users 122, and the one or more user applications 218 implement server-side client-side functionalities (e.g., searching a product catalog in response to a customer query) based on data stored in one or more data stores 240;

Data update module 230 that is executed to manage both real-time data updates and full data refreshes of data items stored in one or more data stores 226, where in some embodiments, the data update module 230 may store supplemental data tracking historical generation times when data items are generated for the real-time data updates, back up the supplemental data, control the full data refreshes based on the supplemental data, and recover the supplemental data lost during changes of data update nodes; and In some embodiments, the computing device 200 includes one or more data stores 240 for storing data items. Data items stored in a data store 240 may be representative of product items included in a catalog of a user application 218 executed on a cloud-based information platform in the network environment 100 (e.g., FIG. 1). The data items stored in each data store 240 may be updated by real-time data changes to maintain up-to-date information in a real-time data update (e.g., an update 312 in FIG. 3). Each data store 240 may be fully refreshed in a full data refresh (e.g., a refresh 314 in FIG. 3) for reasons such as adding new data fields or updating data fields that do not correspond to real-time change events.

Figure 3:
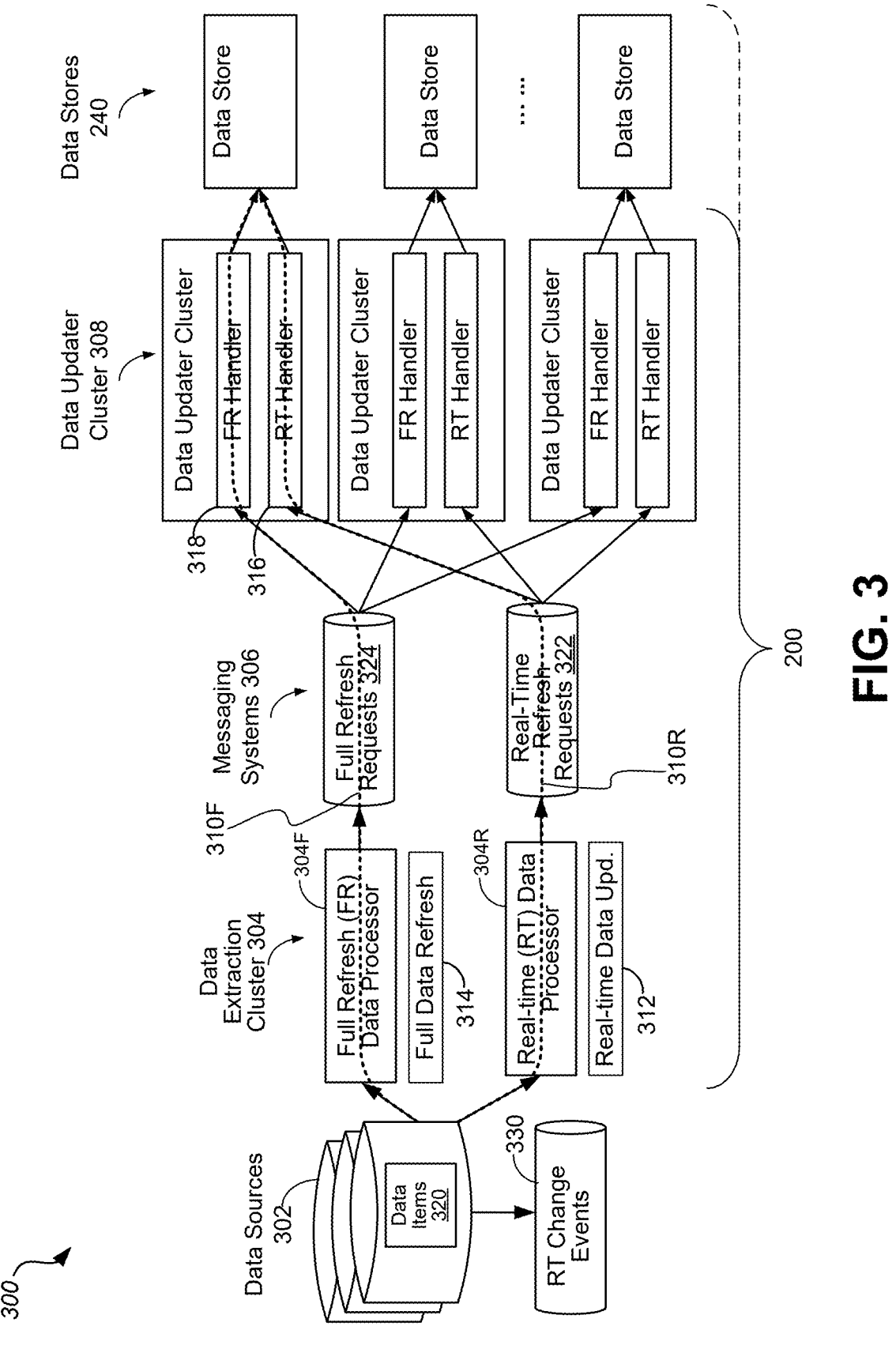
FIG. 3 is a block diagram of an example multi-stage data system for extracting and updating data items onto a plurality of data stores, in accordance with some embodiments.

FIG. 3 is a block diagram of an example multi-stage data system 300 for extracting and updating data items 320 onto a plurality of data stores 240, in accordance with some embodiments. The plurality of data stores 240 is coupled to one or more data sources 302 configured to provide the data items 320 to be updated in the plurality of data stores 240. The multi-stage data system 300 further includes a data extraction cluster 304 coupled to the one or more data sources 302, a messaging system 306, and a data updater cluster 308 coupled to each respective data store 240. For each data store 240, the data extraction cluster 304, the messaging system 306, and the data updater cluster 308 form a full refresh data pipeline 310F and a real-time data pipeline 310R. The real-time data pipeline 310R is applied to implement a real-time data update 312 in which individual data changes are made in real time to maintain up-to-date information of time-sensitive data (e.g., flash sales and inventory changes). The full refresh data pipeline 310F is applied to implement a full data refresh update 314 in which a collection of data items 320 is updated for reasons such as adding new data fields or updating data fields that may not have real-time change events. In an example, the full data refresh update 314 is implemented according to a predefined schedule, upon a user request, or in accordance with a determination that a full refresh condition is satisfied.

In some embodiments, the data extraction cluster 304, the messaging system 306, the data stores 240, and the respective data updater clusters 308 may be implemented on one or more computing device. For example, an instruction memory 202 (FIG. 2) of the computing device 200 may store instructions associated with the data update module 230. The processor(s) 201 of the computing device 200 are operatively coupled to the memory 202 and configured to read instructions associated with the data update module 230 to implement the data extraction cluster 304, the messaging system 306, and the respective data updater clusters 308. Alternatively or additionally, at least some of the data stores 240 may be provided or hosted by one or more third-party providers and communicatively coupled to a computing device 200. In some embodiments, the and the one or more data sources 302 may be separate and distinct from the computing device(s) 200 on which the data extraction cluster 304, the messaging system 306, the data stores 240, and the respective data updater clusters 308 are implemented.

In some embodiments, the one or more data sources 302 store data that may include a plurality of data items 320 having a plurality of data types. The data is provided by the one or more data sources 302, and is updated to the data stores 240 via the full refresh data pipeline 310F and the real-time data pipeline 310R. In some embodiments, the data extraction cluster 304 is coupled to the one or more data sources 302, and configured to read data from the one or more data sources 302, transform the data, or store the transformed data in the messaging system 306. Examples of messaging system 306 are Apache Kafka, Amazon Kinesis, Azure Event Hubs, and Solace. The messaging system 306 is coupled to the data extraction cluster 304, and configured to provide queuing storage for the data that is read from the one or more data sources 302 and/or transformed by the data extraction cluster 304. Further, in some embodiments, the data extraction cluster 304 includes a full refresh data processor 304F and a real-time data processor 304R. The full refresh data processor 304F is configured to process data items 320 that are updated in the full refresh data pipeline 310F, e.g., in response to a full refresh request 324. The real-time data processor 304R is configured to process individual data items 320 that are updated in the real-time data pipeline 310R, e.g., in response to a real-time data update request 322. In some embodiments, the data items 320 may be split into batches for the full data refresh 314. In some embodiments, the individual data items 320 may be consolidated into a batch for the real-time data update 312. Each of the full refresh request 324 and the real-time data update request 322 may be generated by one of the data sources 302, messaging systems 306, data updater clusters 308, and data stores 320.

Figure 4:
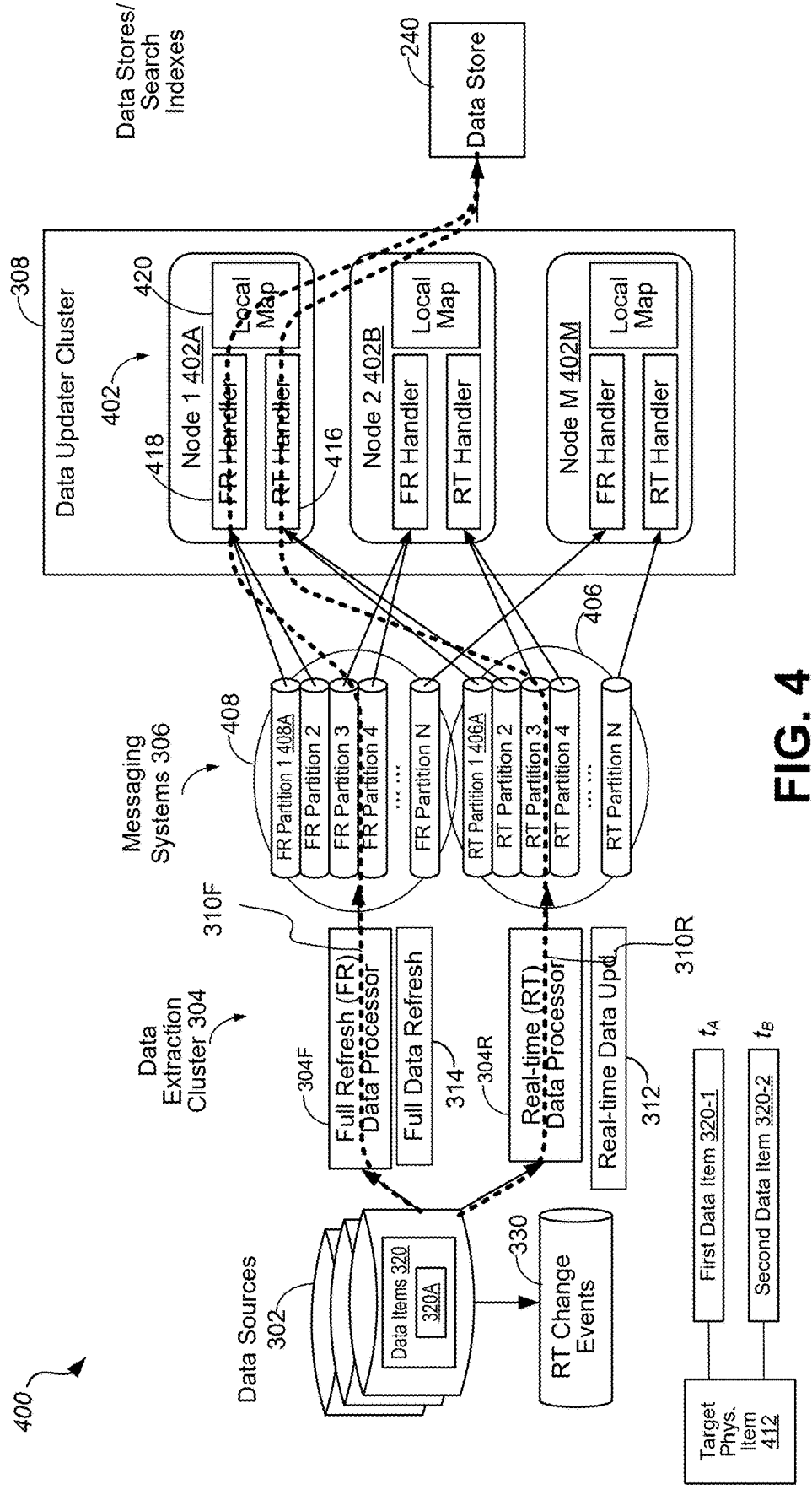
FIG. 4 is a block diagram of a data system that updates a data store via a plurality of data update nodes based on a consistent partition assignment scheme, in accordance with some embodiments.

In some embodiments, the messaging system 306 may assign data item of the data obtained from the data extraction cluster 304 to a plurality of messaging partitions (also called shards) and organized the assigned data items within each messaging partition (e.g., partitions 406 and 408 in FIG. 4). In some embodiments, the data update cluster 308 reads data from the messaging system 306, transforms, and publishes data to the corresponding data store 240. Further, in some embodiments, for each data store 240, the data update cluster 308 includes a real-time (RT) handler 316 for processing the real-time data update 312 and a full refresh (FR) hander 318 for processing the full data refresh 314. In some embodiments, each of the plurality of data stores 240 stores data in a respective format for users 120 to query or search. Further, in some embodiments, the plurality of data stores 240 are coupled to a plurality of data updater clusters 308, and each data updater cluster 308 is configured to update a respective data store 240. Each data store 240 may have a respective type supported by a respective third-party provider, and the at least two of the data stores 240 may be different from each other. In some embodiments, data stores 240 provided by different third-party providers are classified as different types of data stores. In some embodiments, a type of a data store 240 is one of a relational database (also called a structured query language (SQL) database), a non-relational database (also called a NoSQL database), and an object-oriented database. Examples of the non-relational database include, but are not limited to, a key-value database, a wide column store, and a graph database.

FIG. 4 is a block diagram of a data system 400 that updates a data store 240 via a plurality of data update nodes 402 based on a consistent partition assignment scheme, in accordance with some embodiments. The data store 240 is coupled to a data updater cluster 308 including the plurality of data update nodes 402 (e.g., including a first data update node 402A, a second data update node 402B, and an M-th data update node 402M). In some embodiments, each data update node 402 includes a node level RT handler 416, a node level FR handler 418, and an in-memory local map 420. The node level RT handlers 416 of the plurality of data update nodes 402 form a cluster-level RT handler 316 (e.g., as depicted in FIG. 3), and the node level FR handlers 418 of the plurality of data update nodes 402 form a cluster-level FR handler 318 (e.g., as depicted in FIG. 3).

In some embodiments, the data system 400 receives a plurality of data update requests 322, 324 (FIG. 3) including a plurality of data items 320 to be used for updating information stored in data store 240 representing or associated with physical items, such as product items in a catalog.

A plurality of messaging partitions 406, 408 are identified, and each messaging partition 406, 408 uniquely corresponds to a respective subset of physical items. In response to the plurality of data update requests 322, 324, the plurality of data items 320 are assigned to the plurality of messaging partitions 406, 408 including a first messaging partition 406A, 408A. The first messaging partitions 406A, 408A may be assigned to process information of a first subset of physical items. A first subset of data items 320A is identified to be associated with the first subset of physical items, and thereby assigned to the first messaging partition 406A, 408A. The information of the plurality of physical items stored in the data store 420 is updated based on the first subset of data items 320A assigned to the first messaging partition 406A, 408A.

In some embodiments, the first subset of data items 320A includes a first data item 320-1 and a second data item 320-2. The first data item 320-1 and the second data item 320-2 have two different generation times and correspond to the same data item of a target physical item 412 (e.g., a particular product items in a catalog). Further, in some scenarios, the first data item 320-1 has a first generation time $t_A$ subsequent to a second generation time $t_B$ of the second data item 320-2. The first data item 310-1 is updated in the data store 240 with the real-time data update 312, while the second data item 320-2 is updated with the full data refresh 314. Despite its late generation time, the first data item 320-1 is updated in the data store 240 earlier than the second data item 320-2 when the real-time data update 312 occurs before a scheduled full data refresh 314. In some embodiments and in such a scenario, after storing the first data item 320-1 in the data store 240, the data update node 402 aborts storing the second data item 320-2 into the data store 240 during the full data refresh 314.

Alternatively, in some scenarios, the first data item 320-1 has a first generation time $t_A$ earlier than a second generation time $t_B$ of the second data item 320-2, and is updated in the data store 240 earlier than the second data item 320-2. After the first data item 320-1 is stored into the data store 240, the second data item 320-2 is stored in place of the first data item 320-1 into the data store 240. In these situations, each of the first data item 320-1 and the second data item 320-2 may be stored in the data store 240 with a full data refresh 314 or real-time data update 312.

In some scenarios, a first data item 320-1 is received with a real-time data update 312 of the plurality of data items 320. A first generation time $t_A$ is determined for the first data item 320-1 based on a first time stamp of the first data item 320-1. In accordance with a determination that the first data item 320-1 corresponds to the real-time data update 312, the first data item 320-1 is stored in the data store 240. Further, a second data item 320-2 is received with a full data refresh 314 of the plurality of data items 320. In accordance with a determination that the second data item 320-2 corresponds to the full data refresh 314, a second generation time is determined for the second data item 320-2 based on a second time stamp of the second data item 320-2, and compared with the first generation time extracted from a buffer (e.g., an in-memory local map 420). Based on the comparison result, the data update node 402 (e.g., a FR handler 418) determines whether to store the second data item 320-2 in the data store 240. If the comparison result indicates that the second generation time is subsequent to the first generation time, the second data item 320-2 is updated in the data store 240. Conversely, if the comparison result indicates that the second generation time is earlier than the first generation time, the second data item 320-2 is not updated in the data store 240.

When a real-time data update 312 is implemented by a real-time data pipeline 310R, associated data items are assigned by the messaging systems 306 to a plurality of RT messaging partitions 406. Alternatively, when a full data refresh update 314 is implemented by the a full refresh data pipeline 310F, associated data items are assigned by the messaging systems 306 to a plurality of FR messaging partitions 408. In some embodiments, data items provided by the data sources 302 are substantially evenly distributed among the plurality of FR messaging partitions 408, so are the data items distributed evenly distributed among the plurality of RT messaging partitions 406. Each data item is assigned uniquely to a respective FR messaging partition 408 in the full refresh data pipeline 310F during the full data refresh update 314 or a respective RT messaging partition 406 in the real-time data pipeline 310R during the real-time data update 312.

In some embodiments, each of the plurality of RT messaging partitions 406 is uniquely associated with a respective one of the plurality of FR messaging partitions 408. Each respective RT messaging partition 406 (e.g., RT Partition 3) and the respective FR messaging partitions 408 (e.g., FR Partition 3) correspond to a subset of predefined data items stored in the data sources 302. When the subset of predefined data items is updated via the real-time data pipeline 310R or the full refresh data pipeline 310F, the subset of data items is assigned to the respective RT messaging partition 406 (e.g., RT Partition 3) or the respective FR messaging partitions 408 (e.g., FR Partition 3).

In some embodiments, on each data update node 402, the real-time handler 416 processes a set of RT messaging partitions 406 provided by the messaging systems 306, and the full refresh handler 418 processes a set of FR messaging partitions 408 provided by the messaging systems 306. Each of the set of RT messaging partitions 406 is associated with a respective one of the set of FR messaging partitions 408. Stated another way, in accordance with a consistent partition assignment scheme, each data update node 402 is uniquely assigned with the set of RT messaging partitions 406 and the set of FR messaging partitions 408 associated with the set of RT messaging partitions 406. As such, each data update node 402 is uniquely assigned with, and rely on the FR handler 418 and the RT handler 416 to process, the same subset of data items during the full data refresh update 314 and the real-time data update 312, respectively.

In some implementations, for each data update node 402, the consistent partition assignment scheme shown in FIG. 4 uses canonical names of the data update nodes 402 to consistently assign a range of messaging partitions 406 or 408 to the RT handler 416 and the FR handler 418, respectively. Assuming that there are an integer number N of messaging partitions 406 or 408 and an integer number M of data update nodes 402 in a data updater cluster 308. The data update nodes 402 correspond to the integer number M of canonical host names, which may be retrieved based on cluster configurations or from the messaging system 306. The plurality of messaging partitions 406 or 408 (e.g., having N partitions) are substantially evenly assigned into a plurality of ranges (e.g., having M ranges). In an example, the integer number N is not a multiple of the integer number of M, each of a first set of ranges (e.g., including R (e.g., equal to N%M) ranges) includes have a first set of messaging partitions 406 or 408 (e.g., including N/M+1 partitions). Each range of a remainder of the plurality of ranges includes a second set of messaging partitions 406 or 408 (e.g., N/M partitions). The data update nodes 402 are arranged in an ordered sequence based on their canonical host names, and the plurality of ranges may be successively assigned to the ordered sequence of data update nodes 402.

In some embodiments, on each data update node 402, the RT hander 418 and FR handler 416 use the consistent partition assignment scheme. After partition assignment, each data update node 402 is assigned uniquely to update a range of messaging partitions 406 and 408, independently of the full data refresh update 314 and the real-time data update 312. Further, in some embodiments, the messaging systems 306 of different types have the same number of partitions 406 or 408, and the consistent partition assignment scheme applies to the different types of messaging systems 306.

In some embodiments, when each data update node 402 is initialized, the RT hander 418 and FR handler 416 subscribe to the messaging system 306, and are assigned with associated messaging partitions 408 and 406. In an example, the RT hander 418 and FR handler 416 of the data update node 402A are consistently assigned N/M or N/M+1 messaging partitions 408. When partition assignment for the RT hander 418 and FR handler 416 are completed, an assignment map maps messaging partitions 406 and 408 to the data update nodes 402 (e.g., represented by respective host names), and is stored in a known persistent storage location (e.g., in a database record or a Zookeeper storage location.). In some situations, after the RT hander 418 completes partition assignment, the RT hander 418 starts processing data items 320 associated with a set of assigned messaging partitions 408. For example, the RT hander 418 on the data update node 402A stores a first data item 320A from a message partition assigned to the node 402A in the data store 240, determines supplemental data associated with the first data item 320A, and stores the supplemental data in the in-memory local map 420 of the data update node 402A. The supplemental data associated with the first data item 320A includes a partition identifier uniquely identifying a corresponding messaging partition 408 to which the first data item 320A is assigned, a data item identifier uniquely identifying the first data item 320A, and a historical time stamp indicating a generation time of the first data item 320A.

In some embodiments, the FR handler 418 waits and does not check the in-memory local map 420, until partition assignment of the RT hander 418 and FR handler 416 is completed and the in-memory local map 420 is stored with valid content. For example, on the first data update node 402A, when the FR handler 418 completes its partition assignment and the in-memory local map 420 is ready, the FR handler 418 starts processing data items from assigned messaging partitions 408. On each data item, the FR handler 418 uses the in-memory local map 420 to check if the data item has been processed with a newer generation time. In accordance with a determination that the data item has been processed with the newer generation time stored in the in-memory local map 420, the FR handler 418 aborts updating, in the data store 240, the same data item from the full data refresh update 314.

Having described the elements of data systems 300 and 400, examples of handling data updates in such systems will now be described. Referring to FIGS. 3 and 4, in some embodiments, a data system receives a plurality of data update requests 322 and/or 324 including a plurality of data items 320 for updating information of a plurality of physical items in the data store 240. A plurality of messaging partitions 406 and/or 408 are identified. Each messaging partition 406 or 408 corresponds to a respective subset of physical items and a respective data update node 402 associated with the data store 240. In response to the plurality of data update requests 322 and/or 324, the plurality of data items 320 are assigned to the plurality of messaging partitions 406 and/or 408. Further, in some embodiments, in response to a request 322 or 324, a first batch of data items (e.g., data items 510 in FIG. 6) are associated with a first subset of physical items. A first messaging partition 406A or 408A of the plurality of partitions is associated with the first subset of physical items, and the first batch of data items are assigned to the first messaging partition 406A or 408A. The information of the plurality of physical items stored in the data store 240 is updated based on the generation time of data items when they are stored to the first messaging partition 406A or 408A.

In some embodiments, the plurality of data update requests 322 and/or 324 include one or more full refresh data requests 324 and one or more real-time data requests 322 for processing data changes on a set of data items 320. The set of data items 320 may be written by FR data processor to one or more messaging partitions in messaging partitions 408. Some of data item set 320 may also be written by RT data processor at different time to one or more messaging partitions in messaging partitions 406. A subset of the set of data items corresponds to a respective subset of physical items associated with a first messaging partition 406 or 408. A subset of data items can be written by RT or FR data processor respectively to the first messaging partition 406A or 408A. The subset of data items may be successively processed in batches by one of the handlers 416 and 418 of the first data update node 402A (e.g., the first batch of data items 510 in FIG. 6).

In some embodiments, the plurality of data update requests 322 and/or 324 include a plurality of real-time data requests 322 for updating a set of data items. The set of data items may be assigned to one or more messaging partitions 406. A subset of the set of data items 320 corresponds to a respective subset of physical items associated with a first messaging partition 406A. The subset of data items is assigned to the first messaging partition 406A. The subset of data items may correspond to more than one data update requests 322 and be processed in batches by the RT handler 416 of the first data update node 402A (e.g., the first batch of data items 510 in FIG. 6).

In some embodiments, partition events are synchronized to ensure data stored in the in-memory local map 420 are not corrupted. Examples of the partition events include, but are not limited to, adding a pair of messaging partitions 406 and 408, removing a pair of messaging partitions 406 and 408, cleaning up partition data at a start of a full data refresh 314, and reloading partition data asynchronously.

In some embodiments, a queue is applied to order the partition events (e.g., partition addition, removal, and reload) for a messaging partition 406 or 408. In some embodiments, a locking mechanism is applied so that a single operation is performed for a given messaging partition 406 or 408 independently and without being subject to an interruption by another messaging partition 406 or 408. In some embodiments, a tracking mechanism is applied when a messaging partition 406 or 408 is at a valid state.

In some embodiments, a data updater cluster 308 can host a plurality of in-memory local maps 420 distributed on a plurality of data update nodes 402. The data updater cluster 308 may include a coordinator (not shown) configured to control accesses to the plurality of in-memory local maps

420 and operations among the handlers 416 and 418 of the plurality of data update nodes 402.

Figure 5:
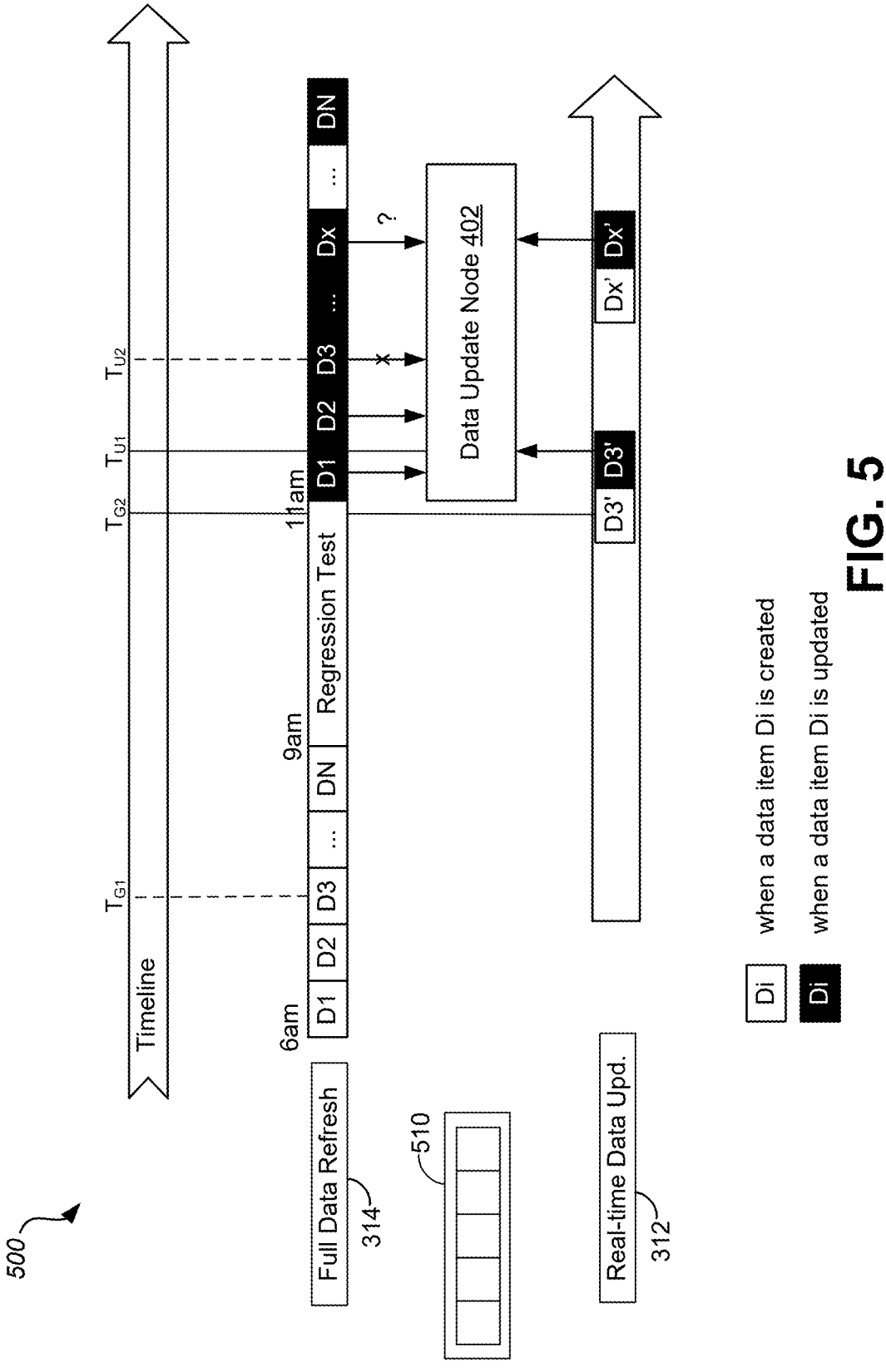
FIG. 5 illustrates an example data update process of preventing a loss of a real-time data update, in accordance with some embodiments.

FIG. 5 illustrates an example data update process of preventing a loss of a real-time data update 312. In some embodiments, a data system (e.g., data system 400 of FIG. 4) includes a plurality of documents, and the full refresh data pipeline 310F takes an extended duration of time to extract and generate the data items 320 during a full data refresh 314. The full refresh data pipeline 310F may also validate the data items 320 before applying mass updates to a data store 240. In some situations, the data processor 304F a data item D3 (e.g., generated at a first generation time $T_{G1}$) for a full data refresh 314. While the data item D3 is processed for the full data refresh 314, a real-time data update 312 occurs. During the real-time data update 312, an associated data item D3' (e.g., a later version of D3) is regenerated in the data sources 302 at a second generation time $T_{G2}$, and applied by the data processor 304R to update the data store 240 at a first update time $T_{U1}$. The second generation time $T_{G2}$ is subsequent to the first generation time $T_{G1}$, and followed directly by the first update time $T_{U1}$. Given the extended duration of time needed by the full refresh data pipeline 310F, the FR handler 418 may tend to update the data item D3 (e.g., the earlier version of D3') in the data store 240 at a second update time $T_{U2}$, which is subsequent to the times $T_{G1}$, $T_{G2}$, $T_{U1}$, and can overwrite the data item updated at the second generation time $t_{G2}$, thereby causing a loss of the real-time data update 312. In some embodiments, a historical time stamp associated with the first generation time $T_{G1}$ is stored in the in-line local map 420 in the real-time data update 312, and applied to determine whether to update a data item (e.g., D3) in the data store 240 during the full data refresh 314.

In some embodiments, a first data update node 402A (FIG. 4) receives a first batch of data items 510 (e.g., including a data item (e.g., D3 or D3')). In accordance with a determination that the first batch of data items 510 corresponds to a real-time data update 312, for each respective data item in the first batch of data items 510, the RT handler 416 of the first data update node 402A updates the respective data item (e.g., D3') in the data store 240, and store, in a first local map 420 associated with the first data update node 402A, supplemental data related to the respective data item including a historical time stamp indicating a historical generation time (e.g., $T_{G2}$) of the respective data item. In accordance with a determination that the first batch of data items 510 corresponds to a full data refresh 314, the FR handler 418 adaptively updates, in the data store 240, a subset of the first batch of data items 510 based on the supplemental data stored in the first local map 420. For example, the FR handler 418 may update the data items D1, D2, and DN, and abort updating the data item (e.g., D3) in view of the data item D3' updated in the real-time data update 312. Stated another way, for each data item 510, the FR handler 418 may determine whether to update the respective data item 510 or abort updating the respective data item 510 based on the supplemental data, thereby making update of the respective data item 510 adaptive and conditional.

Figure 6:
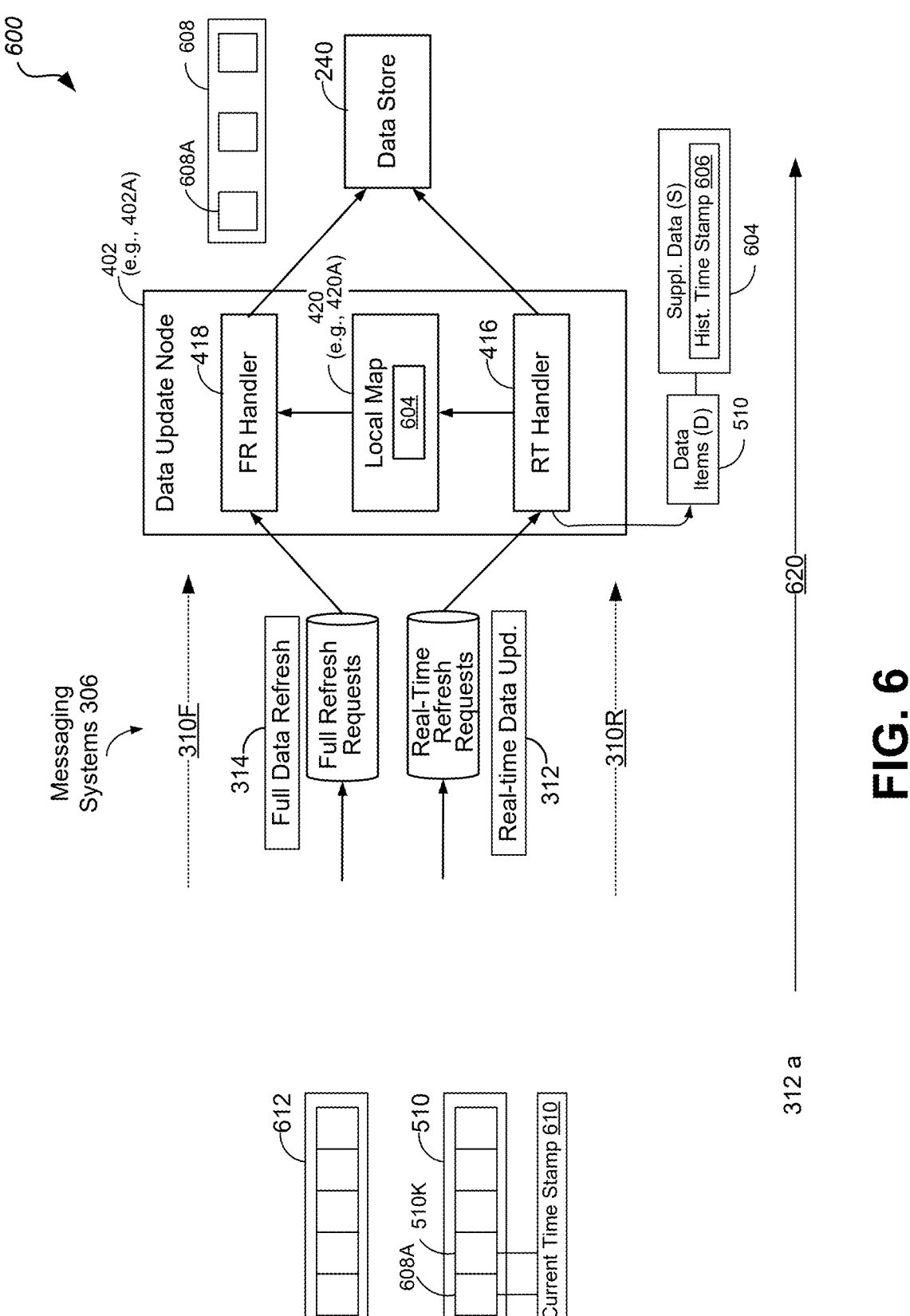
FIG. 6 is a data flow diagram of a process for handling data updates, in accordance with some embodiments.

FIG. 6 is a data flow diagram of a process 600 for handling data updates, in accordance with some embodiments. The process 600 is implemented at a data update node 402 (e.g., a first data update node 402A) associated with a data store 240. The data store 240 is associated with a plurality of data update nodes 402 including the first data update node 402A. The first data update node 402A receives a first batch of data items 510 including one or more data items. In accordance with a determination that the first batch of data items 510 corresponds to a real-time data update 312, each respective data item in the first batch of data items 510 is updated in the data store 240, and supplemental data 604 related to the respective data item 510 are stored in a first local map 420A associated with the first data update node 402A. The supplemental data 604 may include a historical time stamp 606 indicating a historical generation time of each respective data item 510. In some embodiments, the supplemental data 604 of each respective data item 510 may further include a data item identifier (e.g., item_id) uniquely identifying the respective data item 510. Conversely, in accordance with a determination that the first batch of data items 510 corresponds to a full data refresh 314, a subset of data items 608 of the first batch of data items 510 is adaptively updated in the data store 240 based on the supplemental data 604 stored in the first local map 402A. It is noted that, in some embodiments, the respective data item 510 itself is not stored with the supplemental data 604 in the first local map 420A.

In some embodiments, for a first data item 608A of the subset of data items 608, the data update node 402A determines that the first local map 420A does not include the historical time stamp 606 of the first data item 608A, and thereby, updates the first data item 608A in the data store 240. Alternatively, in some embodiments, for a first data item 608A of the subset of data items 608, the data update node 402A extracts, from the first batch of data items 510, a current time stamp 610 of the first data item 608A indicating a current generation time of the first data item 608A, and determines that the first local map 420A stores a corresponding historical time stamp 606 of the first data item 608A indicating the historical generation time of the first data item 608A. The historical time stamp and the current time stamp of the first data item 608A are compared. When the historical generation time of the first data item 608A is earlier than the current generation time of the first data item 608A, the first data item 608A is updated in the data store 240.

In some scenarios, the first batch of data items 510 includes a skipped data item 510K distinct from the subset of data items 608 that is updated in the data store 240. The first batch of data items 510 corresponds to the full data refresh 314. The FR handler 418 determines the first local map 420A already stores the historical time stamp 606 indicating the historical generation time of the skipped data item 510K, and extracts, from the first batch of data items 510, a current time stamp 610 of the skipped data item 510K indicating a current generation time of the skipped data item 510. The historical time stamp 606 and the current time stamp 610 of the skipped data item 510K are compared. In accordance with a determination that that the historical generation time is subsequent to the current generation time of the respective data item indicated by the current time stamp 610 of the skipped data item, the FR handler 418 aborts updating the skipped data item 510K in the data store 240, thereby preventing the skipped data item 510K having an older generation time from overwriting the same data item that is already stored in the data store 240 and has a more recent generation time.

In some embodiments, the data store 240 is configured to store a collection of data items including the first batch of data items 510. The full data refresh 314 is configured to update the collection of data items according to a predefined schedule, and the real-time data update 312 is configured to update different subsets of the collection of data items without a fixed schedule, e.g., when each subset of the collection of data items is available. Each of the subsets of the collection of data items includes less than all of the collection of data items. Each subset of data items may be updated by the real-time data update 312 ad hoc, e.g., when necessary or needed, with non-periodic intervals.

In some embodiments, while the first batch of data items 510 is being updated for the data store 240, a second batch of data items 612 is received and needs to be updated for the data store 240. Further, in some embodiments, the first batch of data items 510 corresponds to the real-time data update 312, and the second batch of data items 612 corresponds to the full data refresh 314. A first subset of the second batch of data items 612 is updated adaptively to the data store 240 based on the supplemental data 604 stored in the first local map 420A. A remaining subset of the second batch of data items 612 is determined to be generated before corresponding data items of the first batch of data items 510, and therefore, are stale data items that do not need to be updated into the data store 240. Further, in some embodiments, in accordance with a determination that the second batch of data items 612 and the first batch of data items 510 share a common item, an update of the second batch of data items 612 (e.g., the full data refresh 314) is suspended. In accordance with a determination that an update of the first batch of data items 510 (e.g., the full data refresh 314) in the data store 240 is completed, the update of the second batch of data items 612 (e.g., the real-time data update 312) is reinitiated, and the common item is adaptively updated based on distinct generation times of the common item in the first batch of data items 510 and the second batch of data items 612.

In some embodiments, the first batch of data items 510 corresponds to the full data refresh 314, and the second batch of data items 612 corresponds to the real-time data update 312. In accordance with a determination that the second batch of data items 612 and the first batch of data items 510 share a common item, an update of the second batch of data items 612 (e.g., the real-time data update 312) is suspended until an update of the first batch of data items 510 (e.g., the full data refresh 314) is completed.

In some embodiments, the first batch of data items 510 corresponds to the full data refresh 314, and the second batch of data items corresponds to the real-time data update 312. In accordance with a determination that the second batch of data items and the first batch of data items does not share any common items, the second batch of data items 612 are updated in the data store 240, independently of an update of the first batch of data items 510 (e.g., the full data refresh 314). More details on two successive updates are explained below with reference to FIGS. 7A and 7B.

In some embodiments, an extended duration of time needed by the full data refresh 314 may cause a loss of a real-time data update 312. On each data update node 402, the RT handler 416 and the FR handler 418 rely on the in-memory local map 420 (e.g., the first local map 420A) to prevent the loss of the real-time data update 312, independently of a type of the data store 240 associated with the data update node 402. In some embodiments, the in-memory local map 420 may be applied to prevent the loss of the real-time data update 312 on each data update node 402, thereby enabling data updates on a data update cluster 308 having a single data update node 402 or a plurality of data update nodes 402. The data updates on the plurality of data update nodes 402 may be implemented concurrently (e.g., in parallel).

In some implementations, each messaging partition 406 or 408 includes a single data pipeline 620 for managing the data items stored in the respective messaging partition 406 or 408, and an update loss may be prevented by processing item changes in order. For example, if a data item was deleted and then is added with new data, the data pipeline 620 processes the changes such that the data item is finally saved with the new data. As such, a data system 300 may ensure proper event ordering by deterministic partitioning of items associated with the data pipelines 310F and 310R and by processing items in the pipeline 620 of each messaging partition 406 or 408 in order. When item updates are saved in the messaging partitions 406 (also called shards) of a messaging system 306, new or changes of each data item are assigned to a respective messaging partition 406. The handler 416 or 418 of each data update node 402 may retrieve data items from one or more respective messaging partitions 406 or 408 and updates the retrieved data items in parallel to the data store 240. The handler 416 or 418 coordinates processes such that the data items retrieved from each respective messaging partition 406 or 408 are processed in order, e.g., matching an order the data items are stored in the respective messaging partition 406 or 408. The handler 416 or 418 always read data items in same messaging partition in same order, and the data items associated with each respective messaging partition 406 or 408 are not processed concurrently.

In some scenarios, the real-time data pipeline 310R and the full refresh data pipeline 310F may be processing two versions of the same data item having two different generation times. The data update node 402 tracks a generation time or a version field to determine which one of the two versions of the data item carried by the pipelines 310R and 310F is older. In some embodiments, the data extraction cluster 304 (FIG. 3) includes a plurality of data update nodes 402 that are synchronized in time (e.g., via a network timing protocol). For example, a precision time protocol (PTP) is applied to manage the data pipelines 310R and 310F on a local area network and provide a clock accuracy level in the sub-microsecond range. In another example, a network timing protocol (NTP) is applied to manage the data pipelines 310R and 310F and provide a clock accuracy level in a sub-millisecond range.

In some embodiments, a data updater cluster 308 includes a single data update node 402, a pair of the RT handler 416 and the FR handler 418 are initialized on the single data update node 402 to support a data store 240. An in-memory local map 420 is initialized for tracking real-time item update status. Supplemental data 604 may be stored in the local map 420, and indicates an item update status with one or more of the following fields:

partition_id: partition or shard identification of the messaging system 306;
item_id: an identifier uniquely identifies a data item; and
gen_time: a timestamp indicating a generation time of the item.

In some embodiments, the RT handler 416 and the FR handler 418 are included in update pipelines 312 and 314 to process item updates, respectively. Each update pipeline 416 or 418 reads a batch of updates from one messaging partition 406 or 408 and process them successively. Each pair of associated messaging partitions 406 and 408 assigned with the same set of data items is identified by a partition identification partition_id and regarded as the same messaging partition. As such, because of deterministic partitioning (e.g., as shown in FIG. 4), item updates with the same partition identification partition_id for both real-time and full refresh pipelines 312 and 314 can happen at the same data update node 402. Loss update prevention can be done on each data update node 402 separately.

In some embodiments, a RT handler 316 and a FR handler 318 can process item updates from a message partition concurrently, and thus there is a need to prevent loss of updates. Race conditions can happen if the RT handler 316 and the FR handler 318 update the same items (e.g., Dx) concurrently. The RT handler 316 and the FR handler 318 are synchronized to avoid updating the same items concurrently. The FR handler 318 applies only item updates that have a newer generation time (gen_time) than previous item updates 310F or 310R.

FIG. 7A is a flow diagram of an example process 700 of updating a batch of data items (e.g., data items 510 in FIGS. 5 and 6) by an RT handler 416, in accordance with some embodiments, and FIG. 7B is a flow diagram of an example process 750 of updating a batch of data items (e.g., data items 510 in FIGS. 5 and 6) by an FR handler 418, in accordance with some embodiments. An RT handler 416 or FR handler 418 in a Data Update Node processes one batch of updates at a time, and does not start a subsequent batch until a current batch completes. At any moment, an update handler 416 or 418 may have a single in-progress batch for data items which are read from a single messaging partition. In an example, the RT and FR handler 416 and 418 apply the following example synchronization primitives and data structures to synchronize batch updates:

frUpdateSet containing a set of identifications of data items in an in-progress batch by the FR handler, wherein frUpdateSet is initialized to an empty set;

rtUpdateSet containing a set of identifications of data items in an in-progress batch by the RT handler, where rtUpdateSet is initialized to an empty set;

a lock for synchronizing RT and FR update handler;

cvFrUpdateSetEmpty representing a condition variable for notification of empty frUpdateSet; and cvRtUpdateSetEmpty representing a condition variable for notification of empty rtUpdateSet.

In some embodiments, when an RT handler starts (operation 702) a batch of items, it set rtUpdateSet is set (operation 704) to represent the updated batch. When rtUpdateSet and frUpdateSet have (operation 706) common items, the RT handler is suspended to wait (operation 706) for cvFrUpdateSetEmpty condition which releases the lock. When cvFrUpdateSetEmpty condition happens, the RT handler wakes up from wait and acquires the lock again. If the RT handler finds no more common items in rtUpdateSet and frUpdateSet, it releases the lock (Operation 710) and proceeds to complete its in-progress update batch. Otherwise, the RT handler waits again for cvFrUpdateSetEmpty condition which releases the lock. When an RT handler completes (operation 712) an update batch, the lock is locked (operation 714). For each item in the update batch, item_id, partition id, and gen_time are stored (operation 716) to the local map 420, and rtUpdateSet is reset (operation 718) with an empty set. Before the lock is released (operation 722), cvRtUpdateSetEmpty is notified (operation 720).

In some embodiments, the FR handler 418 synchronizes updates for the messaging partitions 406 and 408. When an update batch starts (operation 752) in the FR handler 418, the lock is locked (operation 754), and frUpdateSet is created (operation 756) by excluding items in the update batch whose generation time is older than gen_time, which is stored in the local map 420. When rtUpdateSet and frUpdateSet have (operation 758) common items, the FR handler 418 is suspended to wait (operation 760) for cvRtUpdateSetEmpty condition which releases the lock. When cvRtUpdateSetEmpty condition happens, the FR handler wakes up from wait and trims (operation 762) frUpdateSet. If the FR handler 418 finds no common items in rtUpdateSet and frUpdateSet, it releases the lock (Operation 764) and proceeds to complete its in-progress update batch. Otherwise, the FR handler waits again for cvRtUpdateSetEmpty condition which releases the lock. When the FR handler 418 completes (operation 766) an update batch, the lock is locked (operation 768), and frUpdateSet is set (operation 770) with an empty set. Before the lock is released (operation 774), cvFrUpdateSetEmpty is notified (operation 772).

In some embodiments, the FR handler 418 and RT handler 416 are synchronized to control concurrent updates of a data item in predefined scenarios. In some embodiments, during a full data refresh 314, the FR handler 418 updates the data item, and no real-time change event 330 (FIG. 3) happens on the same data item. The in-memory local map 420 does not have the data item, and the FR handler 418 updates the data item with the latest data in the data store 240. In some embodiments, the FR handler 418 updates the data item, before the latest real-time change is processed by the RT handler 416. The RT handler 416 updates the data item with the latest item data. In some embodiments, the FR handler 418 updates the data item, after the latest real-time change was processed by the RT handler 416. The RT handler 416 adds gen_time of the data item in the in-memory local map 420, and the FR handler 418 checks gen_time of the data item and aborts updating the data item. As such, a loss of the real-time data update 312 may be prevented with a partition batch update synchronization procedure involving the in-memory local map 420, where the in-memory local map 420 tracks data item update status and allows the full data refresh 314 to skip the data item having older content.

In some embodiments, supplemental data 604 (FIG. 6) include historical time stamps 606 indicating historical generation times of data items, and are stored in the in-memory local map 420 for a user application (e.g., an online shopping application, a social media application), which has a continuous stream of new data items. The RT handler 416 of each data update node 402 keeps adding new entries to the in-memory local map 420 and causes a size of the in-memory local map 420 to grow. When the size of the in-memory local map 420 increases with the amount of the supplemental data 604, the in-memory local map 420 may be controlled to support a full data refresh 314. Further, in some embodiments, the in-memory local map 420 may be cleared at the start of each full data refresh 314. Real time data items generated before the new full data refresh 314 starts have older gen_time values and can be removed from the in-memory local map 420. The FR data processor 304F (FIG. 3) clears the in-memory local map 420 before starting the full data refresh 314. Alternatively, in some embodiments, the in-memory local map 420 is cleared at the end of each full data refresh 314. The full data refresh 314 includes one or more end-of-session markers. The FR handler 418 detects an end of the full data refresh 314 (e.g., based on an end-of-session marker) and clears the in-memory local map 420. Alternatively and additionally, in some embodiments, the in-memory local map 420 is modified to evict staled map entries. New entries to the in-memory local map 420 have newer gen_time values, and the in-memory local map 420 are modified, e.g., based on an insertion order replacement policy or a time-aware replacement.

Figures 8A, 8B:
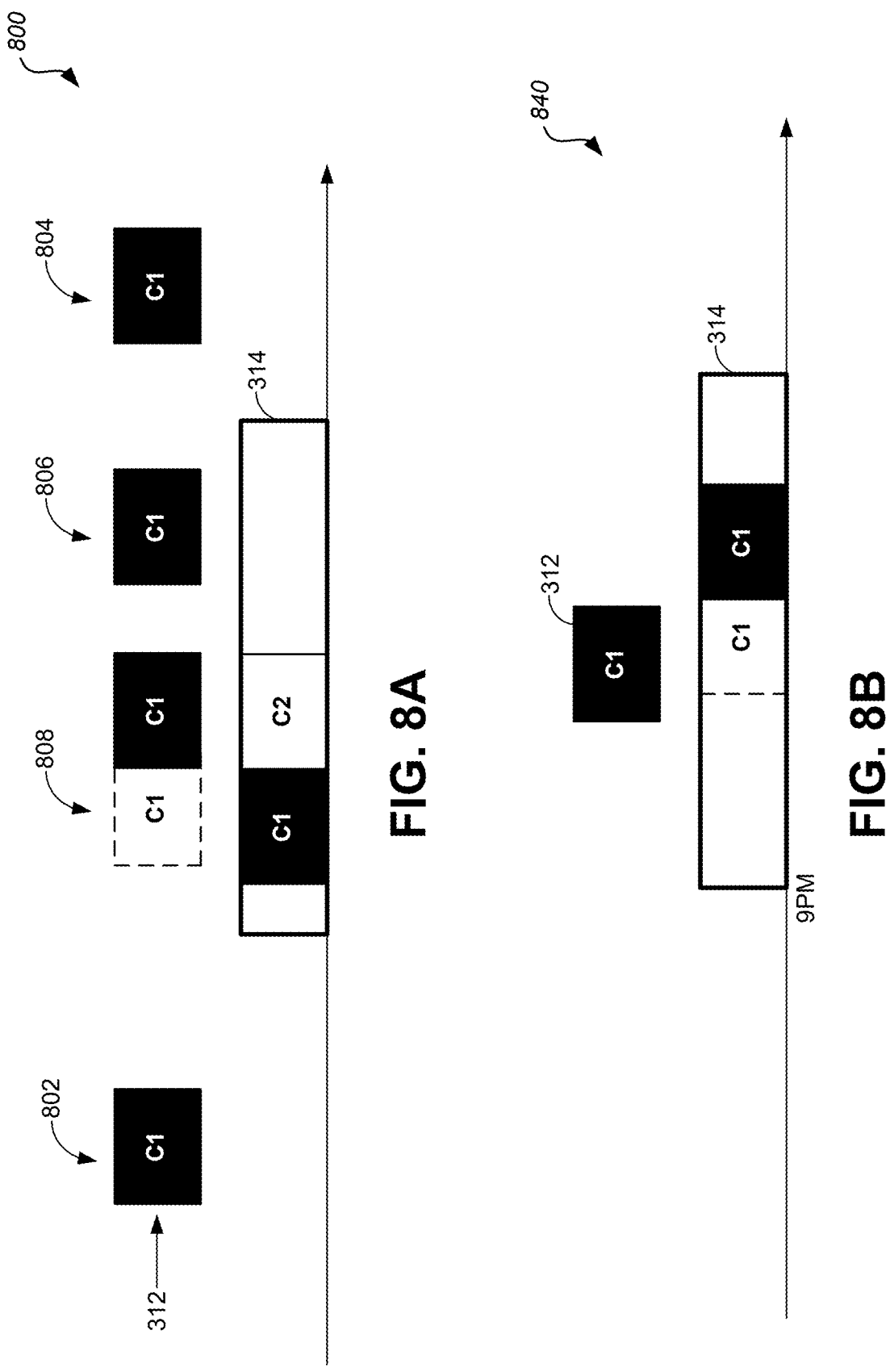
FIGS. 8A and 8B are schematic diagrams showing a full data refresh and a real-time data update of a common data item at a data update node, in accordance with some embodiments.

FIGS. 8A and 8B are schematic diagrams 800 and 840 showing a full data refresh 314 and a real-time data update

312 of a common data item C1 at a data update node 402 (e.g., the first data update node 402A), in accordance with some embodiments. Referring to FIG. 8A, the real-time data update 312 of the common data item C1 may occur before, concurrently with, or after the full data refresh 314. Independently of a temporal order of the real-time data update 312 and the full data refresh 314, a historical generation time 606 (FIG. 6) of the common data item C1 may be stored in a local map 420 of a corresponding data update node 402 after the real-time data update 312 is implemented. In some situations (802), the real-time data update 312 occurs prior to the full data refresh 314. During the full data refresh 314, the historical generation time of the common data item C1 is extracted from the local map 420 and compared with a current generation time of the common data item C1 associated with the full data refresh 314. The common data item C1 associated with the full data refresh 314 is updated to the data store 240 if the historical generation time is earlier than the current generation time, and skipped if the historical generation time is subsequent to the current generation time.

Conversely, in some situations (804), the real-time data update 312 occurs after the full data refresh 314 is completed without impacting, or being impacted by, the full data refresh 314. In some situations (806), the real-time data update 312 occurs concurrently with the full data refresh 314, and more specifically, the real-time data update 312 of the common data item C1 occurs after the full data refresh 314 of the common data item C1. The real-time data update 312 and the full data refresh 314 of the common data item C1 are completed without impacting, or being impacted by, each other. In some situations (808), the real-time data update 312 of the common data item C1 is initiated, while the full data refresh 314 of the common data item C1 is being implemented. The real-time data update 312 of the common data item C1 is suspended, until the full data refresh 314 of the common data item C1 is completed.

Referring to FIG. 8B, in some situations, the full data refresh 314 of the common data item C1 is initiated, while the real-time data update 312 of the common data item C1 is being implemented. The full data refresh 314 of the common data item C1 is suspended, until the real-time data update 312 of the common data item C1 is completed. A current generation time of the common data item C1 associated with the full data refresh 314 is compared with the historical generation time of the common data item C1 associated with the real-time data update 312 to determine whether the full data refresh 314 updates the common data item C1 in the data store 240.

In some embodiments, the RT handler 416 stores, in the in-memory local map 420, supplemental data 604 indicating at least a historical generation time of a data item associated with a real-time data update 312, and the FR handler 418 extracts the supplemental data 604 in the in-memory local map 420 and determines whether to update the data item during a full data refresh 314. Accesses to the in-memory local map 420 are synchronized for the RT handler 416 and the FR handler 418, thereby allowing the in-memory local map 420 to be updated by RT handler 416 and read by FR handler 418 concurrently.

Figure 9:
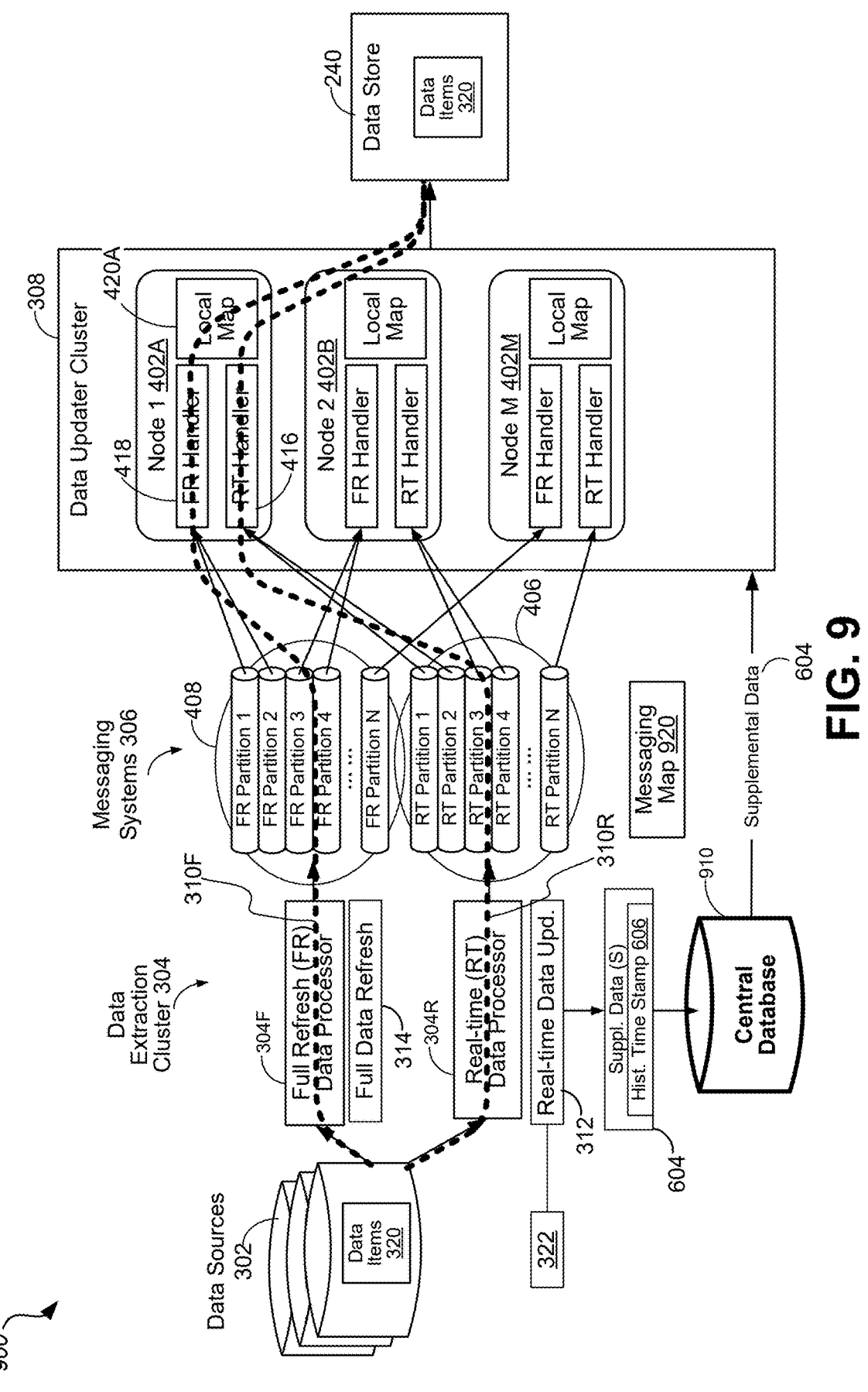
FIG. 9 is a block diagram of an example data system having a central database for storing supplemental data associated with real-time data updates, in accordance with some embodiments.

FIG. 9 is a block diagram of an example data system 900 having a central database 910 for storing supplemental data 604 associated with real-time data updates 312, in accordance with some embodiments. For a data store 240, a plurality of data update nodes 402 of an associated data updater cluster 308 may reload the supplemental data 604 associated with the real-time data updates 312 from the central database 910, e.g., at a time of failure recovery or missing content in the in-memory local map content. More specifically, in some embodiments, one or more real-time data update requests 322 are received to update a plurality of data items 320 at a data store 240. The data store 240 is configured to update the plurality of data items 320 via a plurality of data update nodes 402. Each data update node 420 has a respective in-memory local map 420. For example, a first data update node 402A includes a first local map 420A. In response to the one or more real-time data update requests 322 and for each in the plurality of data items 320, the respective data item 320 is assigned to a respective data update node 402 and updated in the data store 240 by the respective data update node 402. The respective data update node 402 stores, in the respective local map 420, respective supplemental data 604 of the respective data item 320 including a historical time stamp 606 indicating a historical generation time of the respective data item 320. A copy of the respective supplemental data 604 of the respective data item 320 is stored in the central database 910, which is distinct from the respective local map 420 and the data store 240.

In some embodiments, each of the plurality of data update nodes 402 corresponds to a set of one or more messaging partitions 406 and 408, and each messaging partition stores data items 320 associated with a set of predefined physical items. Each data update node 402 is configured to update data items of the set of one or more messaging partitions 406 and 408 via real-time data updates 312 and full data refreshes 314.

In some embodiments, for each of the plurality of data items 320, the copy of the respective supplemental data 604 of the respective data item 320 is stored in the central database 910 in response to the one or more real-time data update requests 322, independently of a type of the data store 420. Stated another way, the copy of the respective supplemental data 604 of the respective data item 320 may have the same data format for different types of data stores 420. In some embodiments, a single copy of the supplemental data 604 of the data items 320 is stored for, and shared among, a plurality of data stores 240, while the data items 320 are updated to the plurality of data stores 240. In some embodiments, the copy of the respective supplemental data 604 are not stored in the central database 910 in response to the full refresh requests 324.

Figure 10:
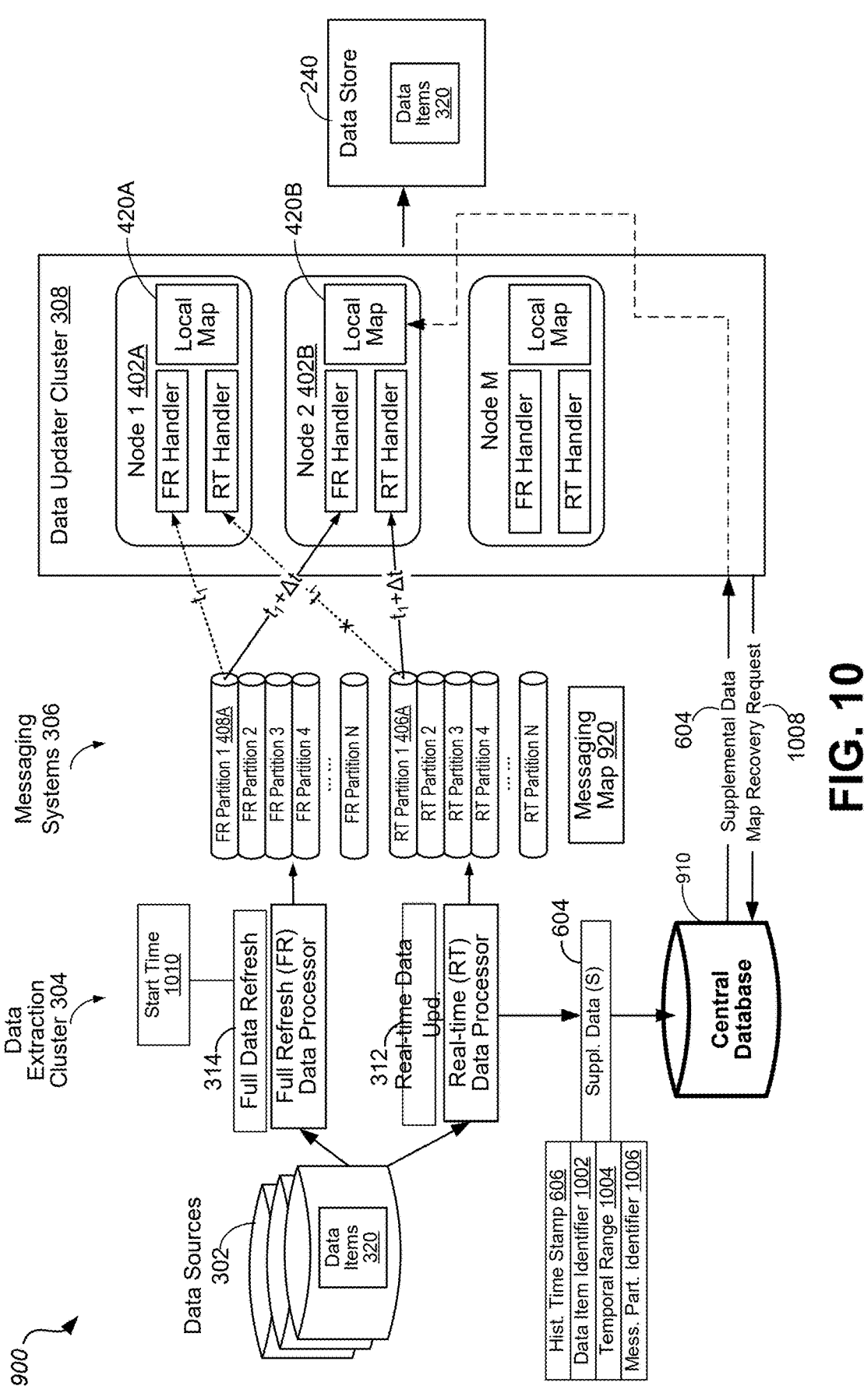
FIG. 10 is a block diagram of an example data system in which a first messaging partition is reassigned between two data update nodes, in accordance with some embodiments.

FIG. 10 is a block diagram of an example data system 900 in which a first messaging partition 408A is reassigned between two data update nodes 402A and 402B, in accordance with some embodiments. A data store 240 is coupled to an associated data updater cluster 308 including a plurality of data update nodes 402, and may reload supplemental data 604 associated the real-time data updates 312 from a central database 910, e.g., at a time of failure recovery or missing content in the in-memory local map content.

In some embodiments, each RT messaging partition 406 may be assigned to a respective data update node 402 jointly with a respective FR messaging partition 408. Each RT messaging partition 406 and its respective FR messaging partition 408 may be regarded as the same messaging partition. A first messaging partition 406A or 408A is originally assigned to a first data update node 402A associated with the data store 240. During a real-time data update 312, supplemental data 604 of a set of data items 320 of the first messaging partition 406A are stored in a first local map 420A, while a copy of the supplemental data 604 is stored in the central database 910. Subsequently, in response to a full data refresh request 324, it is determined that the first messaging partitions 406A and 408A are newly assigned to a second data update node 402B associated with the data store 240. Stated another way the first messaging partitions 406A and 408A are moved between two distinct data update nodes 402 associated with the data store 240. For each of a set of data items 320 of the first messaging partition 406A or 408A, the copy of the respective supplemental data 604 of the respective data item 320 is extracted from the central database 910, and stored in a second local map 420B associated with the second data update node 402B.

In some embodiments, a start time 1010 of the full data refresh 314 associated with the full data refresh request 324 is determined. For each of the set of data items 320 of the first messaging partition 408A, the historical generation time of the respective data item 320 is compared with the start time 1010 of the full data refresh update 314. In accordance with a determination that the historical generation time 606 of the respective data item 320 is subsequent to the start time, the copy of the respective supplemental data 604 of the respective data item 320 is extracted, and stored in the second local map 420B associated with the second data update node 420B.

In some embodiments, while a full data refresh 314 associated with the full data refresh request 324 is implemented, one or more real-time data updates 312 are implemented on a subset of data items 320 of the first messaging partition 406A at the second data update node 402B. The respective supplemental data 604 of the subset of data items 320 of the first messaging partition 406A are stored in the second local map 420B. Further, in some embodiments, after completing the full data refresh 314, the respective supplemental data 604 of the subset of data items 320 of the first messaging partition 406A stored in the second local map 420B of the data store 240 and the copy of the respective supplemental data 604 extracted from the central database 910 are consolidated.

More specifically, in an example, a first latest item generation time stamp 606 corresponds to the respective supplemental data 604 of the set of data items 320 of the first messaging partition 406A extracted from the central database 910 and stored in the second local map 420B. A second latest item generation time stamp is associated with the one or more real-time data updates 312 of the set of data items 320 of the first messaging partition 406A at the second data update node 402B. The first latest item generation time stamp 606 and the second latest item generation time stamp are compared. In accordance with a determination that the first latest item generation time stamp 606 is equal to or newer than the second latest item generation time stamp, the respective supplemental data 604 of the set of data items 320 of the first messaging partition 406A are reloaded from the central database 910 to the second local map 240B. In accordance with a determination that the first latest item generation time stamp 606 is older than the second latest item generation time stamp, the respective supplemental data 604 of the set of data items 320 of the first messaging partition 406A is not loaded from the central database 910 to the second local map 240B.

In some embodiments, after the full data refresh 314 associated with the full data refresh request 324 is completed, the first messaging partition 406A is marked, e.g., as already updated, in the second local map 420B, thereby avoiding repeatedly reloading the supplemental data 604.

Referring to FIG. 10, in some embodiments, one or more data update nodes 402 (e.g., a first data update node 402A) of a data updater cluster 408 associated a data store 240 fails or stops, and the data updater cluster 308 continues to operate. Messaging partitions 406 and 408 assigned to a data update node 402 that has failed are reassigned to another data update node 402 that functions properly. Supplemental data 604 stored in the in-memory local map 420 of the data update node 402 that has failed are needed by the data update node 402 to which the messaging partitions 406 and 408 are reassigned. For example, a first data update node 402A fails at a first time $t_1$, and the first messaging partitions 406A and 408A assigned to the first data update node 402A are reassigned to a second data update node 402B at a second time $t_1 + \Delta t$. A messaging map 920 maps the messaging partitions 406 and 408 to the plurality of data update nodes 402, and is stored for the data update nodes 402. The data updater cluster 308 originally has an integer number M of nodes (FIG. 4), and changes to have M−1 nodes after the first data update node 402A fails. Both the first data update node 402A that fails and the second data update node 402B that receives the messaging partitions 406A and 408A of the first data update node 402A may be identified from the messaging map 920.

In some embodiments, the messaging map 920 includes a first set of hostnames of the M nodes of the data updater cluster 308 captured before the second time $t_1 + \Delta t$, and changes to include a second set of hostnames of the M−1 nodes of the data updater cluster 308 captured after the second time $t_1 + \Delta t$. A hostname of the first data update node 402A that fails is determined by comparing the first set of hostnames and the second set of hostnames of the data update nodes 402 of the data updater cluster 308 as recorded by the messaging map 920 before and after partition reassignment, respectively. In some embodiments, the first data update node 402A is assigned with a set of messaging partitions 406 and 408 including the first messaging partitions 406A and 408A. In some embodiments, the set of messaging partitions 406 and 408 originally assigned to the first data update node 402A is reassigned substantially evenly to the M−1 nodes existing after the first data update node 402A fails, e.g., according to a round-robin scheme, allowing a load balance to be maintained among the remaining M−1 nodes of the data updater cluster 308. Further, in some embodiments, the messaging partitions 406 and 408 originally assigned to the data update nodes 402 that have not failed do not change, e.g., are not reassigned when the first data update node 402A fails.

In some embodiments, the first data update node 402A that fails is restarted or replaced, and the messaging partitions 406 and 408 corresponding to the data store 240 may be reassigned. In some situations, the hostname of the first data update node 402A does not change after the node 402A is restarted or replaced, and partition assignment previously stored in the messaging map 920 is applied again. Conversely, in some situations, the hostname of the first data update node 402A changes after the node 402A is restarted or replaced. The hostname of the first data update node 402A that fails is determined by comparing the first set of hostnames and the second set of hostnames of the data update nodes 402 of the data updater cluster 308. The messaging partitions 406 and 408 previously assigned to the first data update node 402A that fails are identified from the messaging map 920, and reassigned to the M−1 nodes existing after the first data update node 402A fails. The messaging map 920 is updated to associate the reassigned messaging partitions 406 and 408 with the M−1 nodes existing after the first data update node 402A fails and remove entries that associate the reassigned messaging partitions 406 and 408 with the first data update node 402A that fails. In some embodiments, the messaging map 920 is stored in a non-volatile memory of the computing device 200.

In some embodiments, content is recovered for the first local map 420A of the first data update node 402A that fails. When the first data update node 402A fails, the supplemental data 604 stored in the first local map 420A is lost. The supplemental data 604 include a historical time stamp 606 indicating a historical generation time of a respective data item 320 associated with a real-time data update 312. A subset of the supplemental data 604 of the first data update node 402A corresponds to generation times subsequent to a start time 1010 of a full data refresh 314, and is recovered, e.g., from the central database 910. Before the first data update node 402A is restarted, the messaging partitions 406 and 408 assigned to the node 402A are re-assigned to the nodes 402 existing after the first data update node 402A fails. The nodes 402 that are reassigned with the messaging partitions 406 and 408 of the first data update node 402A obtain respective subsets of supplemental data 604 (e.g., real-time item update timestamp data) from the start time 1010 of the full data refresh 314. For example, the messaging partitions 406A and 408A are re-assigned to the second data update node 402B. The second data update node 402B obtains the supplemental data 604 associated with the messaging partitions 406A and having generation times from the start of the full data refresh 314 to a time when the second data update node 402B processes messages received from the second data update node 402B.

In some embodiments, for each data item 320, the respective supplemental data 320 include a historical time stamp 606 of the respective data item 320 and one or more of: a respective data item identifier 1002 uniquely identifying the respective data item 320, a respective temporal range 1004 when the respective data item 320 is updated, and a respective messaging partition identifier 1006 uniquely identifying a respective messaging partition 406 and 408 to which the respective data item 320 is assigned. In some embodiments, the respective supplemental data 320 include a data store identifier uniquely identifying a respective data store 240. For example, an item update status of each data item 320 may be represented by one or more of the following fields of the supplemental data 320:

partition_id: partition or shard identification identifying one of a plurality of messaging partitions 406 and 408 of the messaging system 306;

day: a day on which a corresponding data item 320 is created.

item_id: an identifier uniquely identifying the corresponding data item 320; and gen_time: a historical time timestamp 606 indicating a historical generation time of the corresponding data item 320.

The field name partition id enables a corresponding messaging partition 406 to be loaded. The field names partition_id and item_id help look up the corresponding data item in persistence. The field name day helps in scope of look up in persistence. Different embodiments can have different names. As such, in some embodiments, real-time item generation time data of the supplemental data 604 can be reloaded from the central database 910 to the in-memory local map 420, thereby facilitating a node failure recovery during a full data refresh 314. In some embodiments, the supplemental data 604 stored in the central database 910 is organized based on the fields partition_id and day. Each data update node 402 may retrieve a respective subset of the supplemental data 604 that is associated with the messaging partitions 406 and 408 assigned to the respective data update node 402 and starts from a day when the full data refresh 314 starts.

In some embodiments, a map recovery request 1008 includes a first messaging partitioner identifier. In response to the map recovery request 1008, a first messaging partition 406A (e.g., originally assigned to a first data update node 402A of the data store 240) is identified by the first messaging partitioner identifier. For each of a subset of the plurality of data items associated with the first messaging partition 402A, the respective supplemental data 604 are extracted from the central database 910, e.g., based on the respective data item identifier 1002, and stored in a second local map 420B of a second data update node 402B.

In some embodiments, a map recovery request 1008 includes a first data item identifier. A first data item is identified by the first data item identifier. The first data item is associated with a first messaging partitioner 408A, which is assigned to a second data update node 402B (e.g. after being removed from a first data update node 402A). The supplemental data 606 of the first data item are extracted from the central database 910 based on the first data item identifier, and stored in a second local map 420B of the second data update node 402B.

In some embodiments, a map recovery request 1008 includes a first temporal range (e.g., on a specific day). A subset of the plurality of data items 320 is determined to have been updated (e.g., by a first data update node 402A) in the central database 910 in the first temporal range. It is determined that the subset of the plurality of data items 320 is associated with a first messaging partitioner 408A that is newly assigned to a second data update node 402B. The respective data item identifier 1002 and the historical time stamp 606 of each of the subset of the plurality of data items 320 are extracted from the central database 910, and updated in a second local map 420B of the second data update node 402B.

In some embodiments, a map recovery request 1008 includes a first messaging partitioner identifier and a first temporal range. A subset of the plurality of data items 320 is generated in the first temporal range and assigned to a first messaging partition 406A that is identified by the first messaging partitioner identifier. The first messaging partition 406A is currently assigned to a second data update node 402B. The historical time stamp 606 of each of the subset of the plurality of data items 320 may be stored in the central database 910 by a first data update node 402A to which the first messaging partition 406 is previously assigned, and is copied from the central database 910 to a second local map 420B of the second data update node 402B.

In some embodiments, the supplemental data 604 including real-time item update timestamp data are applied for error recovery. Each data update node 402 may store content of the in-memory local map 420 to a central database 910 (e.g., in a persistent storage), and the content of the in-memory local map 420 is restored from the central database 910 when the respective data update node 402 fails. In some situations, the supplemental data 604 including real-time item update timestamp data are saved to the central database 910, when a data item message is saved in the messaging system 306 (e.g., in response to a real-time refresh request). A data update node 402 to which messaging partitions 406 and 408 are reassigned can retrieve the supplemental data 604 including the real-time item update timestamp data during a node failure recovery process.

Further, in some embodiments, the data system 900 includes a plurality of data stores 240, and each data store 240 is associated with a set of respective in-memory local maps 420 that are configured to track the supplemental data 604 (e.g., including real-time item update status) associated with respective data update nodes 402. A plurality of backup copies are preserved for the contents of the in-memory local maps 420 associated with the plurality of data stores 240. Conversely, in some embodiments of this application, a single copy of the supplemental data 604 (e.g., including real-time item update status) is preserved, and may be applied for content recovery.

In some embodiments, the RT data processor 304R stores the supplemental data 604 including an item update time to the central database 910 after confirming a real-time data update 312 to a messaging system 306. The supplemental data 604 may include additional data to support loading data for an entire messaging partition 406 and retrieval of meta-data of individual data items. This ensures resiliency for the RT handler 416 and the FR handler 418 and provides an ability to reconstruct the in-memory local map 420 by the RT handler 416 and the FR handler 418.

In some embodiments, item generation time data associated with real-time data updates 312 are needed during a full data refresh 314 to support concurrent implementation of the full data refresh 314 and the real-time data update 312. When a data update node 402 is assigned new messaging partitions 406 or 408 during an active full data refresh 314, the data update node 402 reloads the item generation time data from the central database 910. For example, the data update node 402 determines the number of days of the item generation time data to reload since the start of the full data refresh 314, and loads the item generation time data for its newly assigned messaging partitions 406 and 408 that are newer than the start time of the full data refresh 314, which is currently active. Further, in some embodiments, the RT handler 416 on the data update node 402 may continue processing real-time update messages when the item generation time data is being reloaded from the central database 910. Upon completion of reloading the item generation time data, the data update node 402 stores both supplemental data 604 generated locally for recent real-time data updates 312 and reloaded generation time data into in-memory local map 420, and marks the in-memory local map 420 as ready for use in the full data refresh 314, which is implemented by the FR handler 418. The FR handler 418 may resume message processing in accordance with a determination that the in-memory local map 420 is ready to be accessed.

In some embodiments, item generation time data are replicated in the central database 910 to enhance data resiliency and support a data system that spans a plurality of geographic regions. Further, in some embodiments, each data update node 402 manages data inconsistency and guarantees that the in-memory local map 420 has item generation time data to be used in a full data refresh 314. For each newly assigned messaging partition 406 or 408 (e.g., the first messaging partition 406A and 408A), the RT handler 416 continues processing data items and updates item generation timestamps 606 on the in-memory local map 420, while loading real-time item generation timestamps 606 from the central database 910. The RT handler 416 records the earliest item generation timestamp for data items the RT handler 416 has processed since the start of the full data refresh 314. Upon competition of reloading from the central database 910, the RT handler 416 checks if the latest item generation timestamp loaded from the central database 910 is equal to, or newer than the previously recorded earliest item generation timestamp. In accordance with a determination that the latest item generation timestamp loaded from the central database 910 is older than the recorded earliest item generation timestamp, the RT handler 416 triggers a new request to load newer item generation time data from the central database 910. This operation is repeated until the item generation time data reloaded from the central database 910 are equal to or newer than the recorded earliest item generation timestamp. The RT handler 416 moves item generation timestamps 606 from the central database 910 that are equal to or older than the previously recorded earliest item generation time to the in-memory local map 420. A corresponding messaging partition 406 or 408 is marked ready for FR handler 418 to use in the in-memory local map 420.

In some embodiments, when the supplemental data 604 are loaded from the central database 910 for newly assigned messaging partitions 406 and 408, the in-memory local map 420 stores supplemental data 604 including item generation timestamps 606 for two types of data items: (1) data items previously processed by other data update nodes 402 and having generation timestamps reloaded from database and (2) data items that the RT handler 416 has processed after the newly assigned messaging partitions 406 and 408 are reassigned to the respective data update node 402. In some situations, timestamp ranges of these two types of processed data items overlap, and may avoid a risk of missing time-stamp data due to any potential data inconsistency issue.

FIG. 11 is a flowchart illustrating an example method 1100 for managing data updates of a data store 240, in accordance with some embodiments. The method 1100 is implemented by a system (e.g., including a computing device 102 and/or a cloud-based engine 121 in FIG. 1). Method 1100 may be governed by instructions that are stored in a non-transitory computer readable storage medium and that are executed by one or more processors of a system (e.g., a computing device 102). Each of the operations shown in FIG. 11 may correspond to instructions stored in a computer memory or non-transitory computer readable storage medium (e.g., memory 202 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1100 may be combined and/or the order of some operations may be changed.

A data store 240 is associated with a plurality of data update nodes 402 including a first data update node 402A. The system receives (operation 1102), at the first data update node 402A, a first batch of data items 510 (e.g., of FIGS. 5 and 6). In accordance with a determination that the first batch of data items 510 corresponds to a real-time data update 312, for each respective data item in the first batch of data items 510 (operation 1106), the system updates (operation 1108) the respective data item in the data store 240, and stores (operation 1110), in a first local map 420A associated with the first data update node 402A, supplemental data 604 related to the respective data item including a historical time stamp 606 indicating a historical generation time of the respective data item. In accordance with a determination that the first batch of data items 510 corresponds to a full data refresh 314, the system adaptively updates (operation 1112), in the data store 240, a subset of data items 608 of the first batch of data items 510 based on the supplemental data 604 stored in the first local map 420A.

In some embodiments, the operation 1112 may further include, for a first data item 608A (e.g., of FIG. 6) of the subset 608A of the first batch of data items 510, extracting, from the first batch of data items 510, a current time stamp

610 of the first data item 608A indicating a current generation time of the first data item 608A; determining that the first local map 420A stores a corresponding historical time stamp 606 of the first data item 608A indicating the historical generation time of the first data item 608A; comparing the historical time stamp 606 and the current time stamp 610 of the first data item 608A; determining that the historical generation time of the first data item 608A is earlier than the current generation time of the first data item 608A; and updating the first data item 608A in the data store 240.

In some embodiments, the operation 1112 may further include, for a first data item 608A of the subset of the first batch of data items 510, determining that the first local map 420A does not include the historical time stamp 606 of the first data item 608A and updating the first data item 608A in the data store 240.

In some embodiments, the first batch of data items 510 includes a skipped data item 510K (e.g., of FIG. 6) distinct from the subset of data items 608 of the first batch of data items 510. The method 1100 further includes, in accordance with a determination that the first batch of data items 510 corresponds to the full data refresh 314, determining that the first local map 420A stores the historical time stamp 606 indicating the historical generation time of the skipped data item 510K; extracting, from the first batch of data items 510, a current time stamp 610 of the skipped data item 510K indicating a current generation time of the skipped data item 510K; comparing the historical time stamp 606 and the current time stamp 610 of the skipped data item 510K; determining that the historical generation time is subsequent to the current generation time of the respective data item indicated by the current time stamp 610 of the skipped data item 510K; and abort updating the skipped data item 510K in the data store 240 is aborted.

In some embodiments, the method 1100 further includes, while the first batch of data items 510 is being updated in the data store 240, receiving at the data store 240 a second batch of data items 612 (e.g., of FIG. 6). Further, in some embodiments, the first batch of data items 510 corresponds to the real-time data update 312, and the second batch of data items 612 corresponds to the full data refresh 314. The method 1100 further includes adaptively updating a subset of the second batch of data items 612 based on the supplemental data 604 stored in the first local map 420A. Additionally, in some embodiments, the method 1100 further includes, in accordance with a determination that the second batch of data items 612 and the first batch of data items 510 share a common item (e.g., C1 in FIGS. 8A and 8B), suspending an update of the second batch of data items 612. The method 1100 further includes, in accordance with a determination that an update of the first batch of data items 510 in the data store 240 is completed, reinitiating the update of the second batch of data items 612 and adaptively updating the common item based on distinct generation times of the common item in the first batch of data items 510 and the second batch of data items 612.

In some embodiments, the first batch of data items 510 corresponds to the full data refresh 314, and the second batch of data items 612 corresponds to the real-time data update 312. The method 1100 further includes, in accordance with a determination that the second batch of data items 612 and the first batch of data items 510 share a common item (e.g., C1 in FIGS. 8A and 8B), suspending an update of the second batch of data items 612 until an update of the first batch of data items 510 is completed.

In some embodiments, the first batch of data items 510 corresponds to the full data refresh 314, and the second batch of data items 612 corresponds to the real-time data update 312. The method 1100 further includes, in accordance with a determination that the second batch of data items 612 and the first batch of data items 510 does not share any common items, updating the second batch of data items 612 in the data store 240, independently of an update of the first batch of data items 510.

In some embodiments, the method 1100 further includes receiving a plurality of data update requests including a plurality of data items 320 (FIG. 3) for updating information of a plurality of physical items in the data store 240; identifying a plurality of messaging partitions 406 and 408 each of which corresponds to a respective subset of physical items and a respective data update node associated with the data store 240; and in response to the plurality of data update requests, assigning the plurality of data items to the plurality of messaging partitions 406 and 408.

Further, in some embodiments, assigning the plurality of data items to the plurality of messaging partitions further includes determining that the first batch of data items 510 are associated with a first subset of physical items, and a first messaging partition 406A or 408A of the plurality of messaging partitions 406 and 408 is associated with the first subset of physical items. Assigning the plurality of data items to the plurality of messaging partitions further includes assigning the first batch of data items 510 to the first messaging partition 406A or 408A. The information of the plurality of physical items stored in the data store 240 is updated based on the first batch of data items 510 assigned to the first messaging partition 406A or 408A. Additionally, in some embodiments, the plurality of data update requests includes one of a full refresh data request and a real-time data request for updating a set of data items. The method 1100 further includes determining that a subset of the set of data items corresponds to a respective subset of physical items associated with a first messaging partition 406A or 408A, assigning the subset of data items to the first messaging partition 406A or 408A, and generating (e.g., splitting) a plurality of batches including the first batch of data items 510.

Alternatively, in some embodiments, the plurality of data update requests includes a plurality of real-time data requests for updating a set of data items. the method 1100 further includes determining that a subset of data items corresponds to a respective subset of physical items associated with a first messaging partition 406A or 408A, assigning the subset of data items to the first messaging partition 406A or 408A, and consolidating the subset of data items into the first batch of data items 510.

In some embodiments, the supplemental data 604 of each respective data item include a data item identifier 1002 (FIG. 10) uniquely identifying the respective data item and the historical time stamp 606.

In some embodiments, the data store 240 is configured to store a collection of data items including the first batch of data items 510. The full data refresh 314 is configured to update the collection of data items according to a predefined schedule, and the real-time data update 312 is configured to update different subsets of the collection of data items without a fixed schedule. Each of the subsets of the collection of data items includes less than all of the collection of data items.

FIG. 12 is a flowchart illustrating another example method 1200 for managing data updates of a data store 240, in accordance with some embodiments. The method 1200 is implemented by a system (e.g., including a computing device 102 and/or a cloud-based engine 121 in FIG. 1).

Method 1400 may be governed by instructions that are stored in a non-transitory computer readable storage medium and that are executed by one or more processors of a system (e.g., a computing device 102). Each of the operations shown in FIG. 12 may correspond to instructions stored in a computer memory or non-transitory computer readable storage medium (e.g., memory 202 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1400 may be combined and/or the order of some operations may be changed.

The system receives (operation 1202) a plurality of data update requests including a plurality of data items to be used for updating information of a plurality of physical items stored in a data store 240 and identifies (operation 1204) a plurality of messaging partitions 406 and 408 each of which corresponds to a respective subset of physical items. In response to the plurality of data update requests, the system assigns (operation 1206) the plurality of data items to the plurality of messaging partitions 406 and 408. For a first messaging partition 406A or 408A, the system identifies (operation 1208) a first subset of data items associated with a first subset of physical items corresponding to the first messaging partition 406A or 408A and assigns (operation 1210) the first subset of data items to the first messaging partition 406A or 408A. The system updates (operation 1212) the information of the plurality of physical items stored in the data store 240 based on the first subset of data items assigned to the first messaging partition 406A or 408A.

In some embodiments, the first subset of data items includes a first data item and a second data item, and the first data item and the second data item have two different generation times and correspond to the same data item of a target physical item. Further, in some embodiments, the first data item has a first generation time subsequent to a second generation time of the second data item. The method 1200 further includes, after storing the first data item in the data store 240, aborting storing the second data item into the data store 240.

In some embodiments, the first data item has a first generation time earlier than a second generation time of the second data item. The method 1200 further includes, after storing the first data item into the data store 240, storing the second data item in place of the first data item into the data store 240.

In some embodiments, the first data item is received with a real-time data update 312 of the plurality of data items. The method 1200 further includes determining a first generation time for the first data item based on a first time stamp of the first data item, and in accordance with a determination that the first data item corresponds to the real-time data update 312, storing the first data item in the data store 240. Additionally, the second data item is received with a full data refresh 314 of the plurality of data items. The method 1200 further includes, in accordance with a determination that the second data item corresponds to the full data refresh 314, determining a second generation time for the second data item based on a second time stamp of the second data item, extracting the first generation time from a buffer, compares the second generation time with the first generation time to generate a comparison result; and based on the comparison result, determining whether to store the second data item in the data store 240.

FIG. 13 is a flowchart illustrating another example method 1300 for managing data updates of a data store, in accordance with some embodiments. A central database 910 (e.g., in FIGS. 9 and 10) is applied for preventing data loss and recovering lost data. The method 1300 is implemented by a system (e.g., including a computing device 102 and/or a cloud-based engine 121 in FIG. 1). Method 1300 may be governed by instructions that are stored in a non-transitory computer readable storage medium and that are executed by one or more processors of a system (e.g., a computing device 102). Each of the operations shown in FIG. 13 may correspond to instructions stored in a computer memory or non-transitory computer readable storage medium (e.g., memory 202 in FIG. 2). The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 1300 may be combined and/or the order of some operations may be changed.

The system receives (operation 1302) one or more real-time data update requests 322 to update a plurality of data items 320 stored at a data store 240 (e.g., of FIG. 3). The data store 240 is configured to update the plurality of data items 320 via a plurality of data update nodes 402, and each data update node 402 has a respective local map 420. In response to the one or more real-time data update requests 322 (e.g., of FIG. 3) and for each respective data item in the plurality of data items 320 (operation 1306), the system assigns (operation 1308) the respective data item to a respective data update node; updates (operation 1310) the respective data item in the data store 240; and store (operation 1312), in the respective local map 420 of the respective data update node 402, respective supplemental data 604 of the respective data item including a historical time stamp 606 (e.g., of FIG. 4) indicating a historical generation time of the respective data item. The system also stores (operation 1314), in a central database 910 (e.g., of FIG. 9), a copy of the respective supplemental data 604 of the respective data item. The central database 910 is distinct from the respective local map 420 and the data store 240.

In some embodiments, each of the plurality of data update nodes 402 corresponds to a set of one or more messaging partitions 406 and 408, and each messaging partition 406 or 408 stores data items 320 associated with a set of predefined physical items. Each data update node 402 is configured to update data items of the set of one or more messaging partitions 406 and 408 via real-time data updates 312 and full data refreshes 314.

In some embodiments, for each respective data item in the plurality of data items 320, the copy of the respective supplemental data 604 of the respective data item is stored in the central database 910 in response to the one or more real-time data update requests 322, independently of a type of the data store 240.

In some embodiments, a first messaging partition 406A or 408A is originally assigned to a first data update node 402A associated with the data store 240. The method 1300 further includes, in response to a full data refresh request 324, determining that the first messaging partition 406A or 408A is newly assigned to a second data update node 402B associated with the data store 240. The method 1300 further includes, for each of a set of data items of the first messaging partition 406A or 408A, extracting, from the central database 910, the copy of the respective supplemental data 604 of the respective data item and storing the copy of the respective supplemental data 604 of the respective data item in a second local map 420B associated with the second data update node 402B.

Further, in some embodiments, the method 1300 further includes determining a start time 1010 (e.g., of FIG. 10) of a full data refresh 314 associated with the full data refresh request 324 and, for each of the set of data items of the first messaging partition 406A or 408A, comparing the historical generation time of the respective data item with the start time 1010. In accordance with a determination that the historical generation time of the respective data item is subsequent to the start time 1010, the copy of the respective supplemental data 604 of the respective data item is extracted, and stored in the second local map 420B associated with the second data update node.

In some embodiments, the method 1300 further includes, while implementing a full data refresh 314 associated with the full data refresh request 324, implementing one or more real-time data updates 312 of a subset of data items of the first messaging partition 406A or 408A at the second data update node and storing, in the second local map 420, the respective supplemental data 604 of the subset of data items of the first messaging partition 406A or 408A.

Additionally, in some embodiments, the method 1300 further includes, after completing the full data refresh 324, consolidating the respective supplemental data 604 of the subset of the first messaging partition 406A or 408A stored in the first local map 420 of the data store 240 and the copy of the respective supplemental data 604 extracted from the central database 910.

In some embodiments, the method 1300 further includes determining a first latest item generation time stamp corresponding to the respective supplemental data 604 of the set of data items of the first messaging partition 406A or 408A extracted from the central database 910 and stored in the second local map 420, determining a second latest item generation time stamp associated with the one or more real-time data updates 312 of a subset of data items of the first messaging partition 406A or 408A at the second data update node 402B, and comparing the first latest item generation time stamp and the second latest item generation time stamp. Additionally, in some embodiments, the method 1300 further includes, in accordance with a determination that the first latest item generation time stamp is equal to or newer than the second latest item generation time stamp, repeating loading of the respective supplemental data 604 of the set of data items of the first messaging partition 406A or 408A from the central database 910 to the first local map 420.

In some embodiments, the method 1300 further includes, after completing the full data refresh 324 associated with the full data refresh request 324, marking the first messaging partition 406A or 408A in the second local map 420B.

In some embodiments, each respective data item, the respective supplemental data 604 include the historical time stamp 606 of the respective data item and one or more of: a respective data item identifier 1002 (e.g., of FIG. 10) uniquely identifying the respective data item, a respective temporal range 1004 (e.g., of FIG. 10) when the respective data item is updated, and a respective messaging partition identifier 1006 (e.g., of FIG. 10) uniquely identifying a respective messaging partition to which the respective data item is assigned.

Further, in some embodiments, the method 1300 further includes, in response to a map recovery request 1008 (e.g., of FIG. 10) including a first messaging partition identifier, identifying a first messaging partition 406A or 408A based on the first messaging partition identifier 1006. The first messaging partition 406A or 408A is originally assigned to a first data update node 402A of the data store 240. The method 1300 further includes, extracting, from the central database 910, the respective supplemental data 604 for the subset of the plurality of data items 320 associated with the first messaging partition 406A or 408A, and storing, in a second local map 420B of a second data update node 402B, the respective supplemental data 604 associated with the subset of the plurality of data items 320 associated with the first messaging partition 406A or 408A.

Alternatively, in some embodiments, the method 1300 further includes, in response to a map recovery request 1008 including a first data item identifier 1002, identifying a first data item identified by the first data item identifier 1002, determining that the first data item is associated with a first messaging partition 406A or 408A that is reassigned from a first data update node 402 to a second data update node 402B, extracting, from the central database 910, the respective supplemental data 604 of the first data item based on the respective data item identifier 1002, and storing, in a second local map 420B of the second data update node 402B, the respective supplemental data 604 of the first data item.

Alternatively, in some embodiments, the method 1300 further includes, in response to a map recovery request 1008 including a first temporal range 1004, determining that a subset of the plurality of data items 320 is updated in the central database 910 in the first temporal range 1004; determining that the subset of the plurality of data items 320 is assigned to a first messaging partition 406A or 408A newly assigned to a second data update node 402B of the data store 240; extracting, from the central database 910, the respective data item identifier 1002 and the historical time stamp 606 of each of the subset of the plurality of data items 320; and updating, in a second local map 420B of the second data update node 402B, the respective data item identifier 1002 and the historical time stamp 606 of each of the subset of the plurality of data items 320.

Alternatively, in some embodiments, the method 1300 further includes, in response to a map recovery request 1008 including a first messaging partition identifier and a first temporal range 1004, identifying a subset of the plurality of data items 320 that is generated in the first temporal range 1004 and assigned to a first messaging partition 406A or 408A that is identified by the first messaging partition identifier 1006; determining that the first messaging partition 406A or 408A is currently assigned to a second data update node 402B; and copying, from the central database 910 to a second local map 420B of the second data update node 402B, the historical time stamp 606 of each of the subset of the plurality of data items 320.

Some implementations of this application are directed to a lost update prevention method that is applied independently of a type of a data store 240 at an application layer. The lost update prevention method minimizes changes on applications when a data system changes its downstream data store types. The lost update prevention method uses a partition batch update synchronization mechanism that prevents two concurrent update pipelines, which perform batch processing with item updates from each message partition, from updating same data items at the same time. The method uses an in-memory local map 420 in every application data update node 402 to coordinates updates by the full data refresh 314 pipeline and the real-time data update pipeline. The real-time pipeline always updates the generation time of each data item in local map after it processed a data item. The full data refresh 314 pipeline looks up the in-memory local map 420 to determine if it needs to skip data items that have older generation time.

Some implementations of this application include a partition batch update synchronization method, which prevents one update pipeline from applying updates with older content. The partition batch update synchronization method minimizes synchronization overhead, when synchronization is done locally on the in-memory map. The workload is distributed among update nodes 402, and can be automatically scaled out horizontally as the updater cluster scales out with more data update nodes 402.

Further, in some embodiments, a consistent partition assignment scheme (e.g., as described with reference to FIG. 4) may be applied to ensure that the FR handler 418 and the RT handler 416 on each data update node 402 process data items from same partitions in a messaging system 308. The consistent partition assignment scheme may minimize a number of messaging partitions to reassign and recover on node failures by preserving partition assignment on functioning update nodes 402.

In some embodiments, recovery of local map content on update node failures is done without backing up each local map's content separately. Data for node failure recovery is saved in a central database 910 (FIG. 9) when item update messages are generated. Save data is used only during a failure recovery process. In an example, node failure recovery data in the central database 910 includes message partition, day, and timestamp attributes. Node failure recovery data in database is organized in a way that each data update node 402 can retrieve minimal amount of data from the database with partition, day, timestamp values. A procedure is applied to ensure the reconstructed local map content contains all data item update timestamps for loss update prevention.

It should be understood that the particular order in which the operations in any of FIGS. 11-13 have been described are merely examples and are not intended to indicate that the described order is the only order in which the operations could be performed. One of ordinary skill in the art would recognize various ways to cache and distribute specific data as described herein. Additionally, it should be noted that details of any one of the processes described herein with respect to FIGS. 11-13 are also applicable in an analogous manner to the other two of the processes described herein with respect to FIGS. 11-13. For brevity, these details are not repeated.

Each functional component described herein can be implemented in computer hardware, in program code, and/or in one or more computing systems executing such program code as is known in the art. As discussed above with respect to FIG. 2, such a computing system can include one or more processing units which execute processor-executable program code stored in a memory system. Similarly, each of the disclosed methods and other processes described herein can be executed using any suitable combination of hardware and software. Software program code embodying these processes can be stored by any non-transitory tangible medium, as discussed above with respect to FIG. 2.

The foregoing is provided for purposes of illustrating, explaining, and describing embodiments of these disclosures. Modifications and adaptations to these embodiments will be apparent to those skilled in the art and may be made without departing from the scope or spirit of these disclosures. Although the subject matter has been described in terms of example embodiments, it is not limited thereto. Rather, the appended claims should be construed broadly, to include other variants and embodiments, which can be made by those skilled in the art.

What is claimed is:

1. A method for managing data storage, comprising:
receiving one or more real-time data update requests to update a plurality of data items stored at a data store, the data store configured to update the plurality of data items via a plurality of data update nodes, each data update node having a respective local map; and
in response to the one or more real-time data update requests and for each respective data item in the plurality of data items:
assigning the respective data item to a respective data update node;
updating the respective data item in the data store;
storing, in the respective local map of the respective data update node, respective supplemental data of the respective data item including a historical time stamp indicating a historical generation time of the respective data item; and
storing, in a central database, a copy of the respective supplemental data of the respective data item, the central database distinct from the respective local map and the data store; and
in response to a full data refresh request:
determining that a first messaging partition, originally assigned to a first data update node associated with the data re, is newly assigned to a second data update node associated with the data store, wherein first messaging partition is originally assigned to a first data update associated with the data store; and
for each of a set of data items of the first messaging partition,
extracting, from the central database, the copy of the respective supplemental data of the respective item; and
storing the copy of the respective supplemental data of the respective data item in a second local map associated with the second data update node.

2. The method of claim 1, wherein each of the plurality of data update nodes corresponds to a set of one or more messaging partitions, and each messaging partition stores data items associated with a set of predefined physical items, and wherein each data update node is configured to update data items of the set of one or more messaging partitions via real-time data updates and full data refreshes.

3. The method of claim 1, wherein, for each respective data item in the plurality of data items, the copy of the respective supplemental data of the respective data item is stored in the central database in response to the one or more real-time data update requests, independently of a type of the data store.

4. The method of claim 1, further comprising:
determining a start time of a full data refresh associated with the full data refresh request; and
for each of the set of data items of the first messaging partition, comparing the historical generation time of the respective data item with the start time, wherein in accordance with a determination that the historical generation time of the respective data item is subsequent to the start time, the copy of the respective supplemental data of the respective data item is extracted, and stored in the second local map associated with the second data update node.

5. The method of claim 1, further comprising, while implementing a full data refresh associated with the full data refresh request:

implementing one or more real-time data updates of a subset of data items of the first messaging partition at the second data update node; and storing, in the second local map, the respective supplemental data of the subset of data items of the first messaging partition.

6. The method of claim 5, further comprising, after completing the full data refresh, consolidating the respective supplemental data of the subset of the first messaging partition stored in the first local map of the data store and the copy of the respective supplemental data extracted from the central database.

7. The method of claim 5, further comprising:

determining a first latest item generation time stamp corresponding to the respective supplemental data of the set of data items of the first messaging partition extracted from the central database and stored in the second local map;

determining a second latest item generation time stamp associated with the one or more real-time data updates of a subset of data items of the first messaging partition at the second data update node; and comparing the first latest item generation time stamp and the second latest item generation time stamp.

8. The method of claim 7, further comprising:

in accordance with a determination that the first latest item generation time stamp is equal to or newer than the second latest item generation time stamp, repeating loading of the respective supplemental data of the set of data items of the first messaging partition from the central database to the first local map.

9. The method of claim 5, further comprising:

after completing the full data refresh associated with the full data refresh request, marking the first messaging partition in the second local map.

10. The method of claim 1, wherein for each respective data item, the respective supplemental data include the historical time stamp of the respective data item and one or more of:

a respective data item identifier uniquely identifying the respective data item;

a respective temporal range when the respective data item is updated; and a respective messaging partition identifier uniquely identifying a respective messaging partition to which the respective data item is assigned.

11. The method of claim 10, further comprising:

in response to a map recovery request including a first messaging partition identifier:

identifying a first messaging partition based on the first messaging partition identifier, the first messaging partition being originally assigned to a first data update node of the data store;

extracting, from the central database, the respective supplemental data for the subset of the plurality of data items associated with the first messaging partition; and storing, in a second local map of a second data update node, the respective supplemental data associated with the subset of the plurality of data items associated with the first messaging partition.

12. The method of claim 10, further comprising, in response to a map recovery request including a first data item identifier:

identifying a first data item identified by the first data item identifier;

determining that the first data item is associated with a first messaging partition that is reassigned from a first data update node to a second data update node;

extracting, from the central database, the respective supplemental data of the first data item based on the respective data item identifier; and storing, in a second local map of the second data update node, the respective supplemental data of the first data item.

13. The method of claim 10, further comprising, in response to a map recovery request including a first temporal range:

determining that a subset of the plurality of data items is updated in the central database in the first temporal range;

determining that the subset of the plurality of data items is assigned to a first messaging partition newly assigned to a second data update node of the data store;

extracting, from the central database, the respective data item identifier and the historical time stamp of each of the subset of the plurality of data items; and updating, in a second local map of the second data update node, the respective data item identifier and the historical time stamp of each of the subset of the plurality of data items.

14. The method of claim 10, further comprising, in response to a map recovery request including a first messaging partition identifier and a first temporal range:

identifying a subset of the plurality of data items that is generated in the first temporal range and assigned to a first messaging partition that is identified by the first messaging partition identifier;

determining that the first messaging partition is currently assigned to a second data update node; and copying, from the central database to a second local map of the second data update node, the historical time stamp of each of the subset of the plurality of data items.

15. A non-transitory computer-readable storage medium, having instructions stored thereon, which when executed by one or more processors cause the processors to:

receive one or more real-time data update requests to update a plurality of data items stored at a data store, the data store configured to update the plurality of data items via a plurality of data update nodes, each data update node having a respective local map; and in response to the one or more real-time data update requests and for each respective data item in the plurality of data items:

assign the respective data item to a respective data update node;

update the respective data item in the data store;

store, in the respective local map of the respective data update node, respective supplemental data of the respective data item including a historical time stamp indicating a historical generation time of the respective data item; and store, in a central database, a copy of the respective supplemental data of the respective data item, the central database distinct from the respective local map and the data store; and in response to a full data refresh request:

determine that a first messaging partition, originally assigned to a first data update node associated with the data store, is newly assigned to a second data update node associated with the data store, wherein first messaging partition is originally assigned to a first data update node associated with the data store; and for each of a set of data items of the first messaging partition:

extract, from the central database, the copy of the respective supplemental data of the respective data item; and store the copy of the respective supplemental data of the respective data item in a second local map associated with the second data update node.

16. The non-transitory computer-readable storage medium of claim 15, wherein each of the plurality of data update nodes corresponds to a set of one or more messaging partitions, and each messaging partition stores data items associated with a set of predefined physical items, and wherein each data update node is configured to update data items of the set of one or more messaging partitions via real-time data updates and full data refreshes.

17. A system, comprising:

a processor; and a memory having instructions that when executed by the processor cause the processor to:

receive one or more data update requests to update a plurality of data items stored at a data store, the data store configured to update the plurality of data items via a plurality of data update nodes, each data update node having a respective local map; and in response to the one or more real-time data update requests and for each respective data item in the plurality of data items:

assign the respective data item to a respective data update node;

update the respective data item in the data store;

store, in the respective local map of the respective data update node, respective supplemental data of the respective data item including a historical time stamp indicating a historical generation time of the respective data item;

store, in a central database, a copy of the respective supplemental data of the respective data item, the central database distinct from the respective local map and the data store; and in response to a full data refresh request:

determine that a first messaging partition, originally assigned to a first data update node associated with the data store, is newly assigned to a second data update node associated with the data store, wherein first messaging partition is originally assigned to a first data update node associated with the data store; and for each of a set of data items of the first messaging partition, extract, from the central database, the copy of the respective supplemental data of the respective data item; and store the copy of the respective supplemental data of the respective data item in a second local map associated with the second data update node.

18. The system of claim 17, wherein each of the plurality of data update nodes corresponds to a set of one or more messaging partitions, and each messaging partition stores data items associated with a set of predefined physical items, and wherein each data update node is configured to update data items of the set of one or more messaging partitions via real-time data updates and full data refreshes.

19. The system of claim 17, wherein, for each respective data item in the plurality of data items, the copy of the respective supplemental data of the respective data item is stored in the central database in response to the one or more real-time data update requests, independently of a type of the data store.

* * * * *